(12) United States Patent
Horibe et al.

(10) Patent No.: US 9,004,779 B2
(45) Date of Patent: Apr. 14, 2015

(54) ASSEMBLY TOOL AND OPTICAL FIBER CONNECTOR ASSEMBLY METHOD

(75) Inventors: Dai Horibe, Sagamihara (JP);
Tomoyasu Oike, Sagamihara (JP); Kenji Kuwahara, Machida (JP)

(73) Assignee: 3M Innovative Properties Company, St. Paul, MN (US)

( * ) Notice: Subject to any disclaimer, the term of this patent is extended or adjusted under 35 U.S.C. 154(b) by 187 days.

(21) Appl. No.: 13/809,072

(22) PCT Filed: Jun. 21, 2011

(86) PCT No.: PCT/US2011/041201
§ 371 (c)(1),
(2), (4) Date: Jan. 8, 2013

(87) PCT Pub. No.: WO2012/012069
PCT Pub. Date: Jan. 26, 2012

(65) Prior Publication Data
US 2013/0114932 A1    May 9, 2013

Related U.S. Application Data

(60) Provisional application No. 61/365,430, filed on Jul. 19, 2010, provisional application No. 61/423,246, filed on Dec. 15, 2010.

(51) Int. Cl.
*G02B 6/36* (2006.01)
*G02B 6/38* (2006.01)

(52) U.S. Cl.
CPC ............ *G02B 6/3898* (2013.01); *G02B 6/3846* (2013.01); *G02B 6/3858* (2013.01)

(58) Field of Classification Search
USPC ............................................. 385/78
See application file for complete search history.

(56) References Cited

U.S. PATENT DOCUMENTS

| | | |
|---|---|---|
| 5,408,558 A | 4/1995 | Fan |
| 5,673,347 A | 9/1997 | Pitassi |
| 6,439,780 B1 * | 8/2002 | Mudd et al. ............ 385/83 |
| 7,194,179 B1 * | 3/2007 | Bryant et al. ............ 385/134 |
| 2008/0226236 A1 | 9/2008 | Pepin |
| 2010/0316344 A1 | 12/2010 | Bylander |

FOREIGN PATENT DOCUMENTS

| | | |
|---|---|---|
| JP | 2000-065679 A | 3/2000 |
| JP | 2002-357741 A | 12/2002 |
| JP | 2007-121862 A | 5/2007 |
| JP | 2007-240943 A | 9/2007 |
| WO | WO 2010/088184 | 8/2010 |
| WO | WO 2010/132187 | 11/2010 |

* cited by examiner

Primary Examiner — Uyen Chau N Le
Assistant Examiner — Hoang Tran
(74) Attorney, Agent, or Firm — Janet A. Kling

(57) ABSTRACT

An assembly tool is provided for installing an optical fiber in an optical fiber connector having a known length of fiber extending from the connector ferrule after termination of the optical fiber connector. The assembly tool includes a base having a connector mount disposed on a first end thereof and a cradle that holds a shaped ferrule disposed near the second end of the base, such that shaped ferrule is resiliently held within the cradle. The connector mount is configured to receive and secure the optical fiber connector to the base.

11 Claims, 22 Drawing Sheets

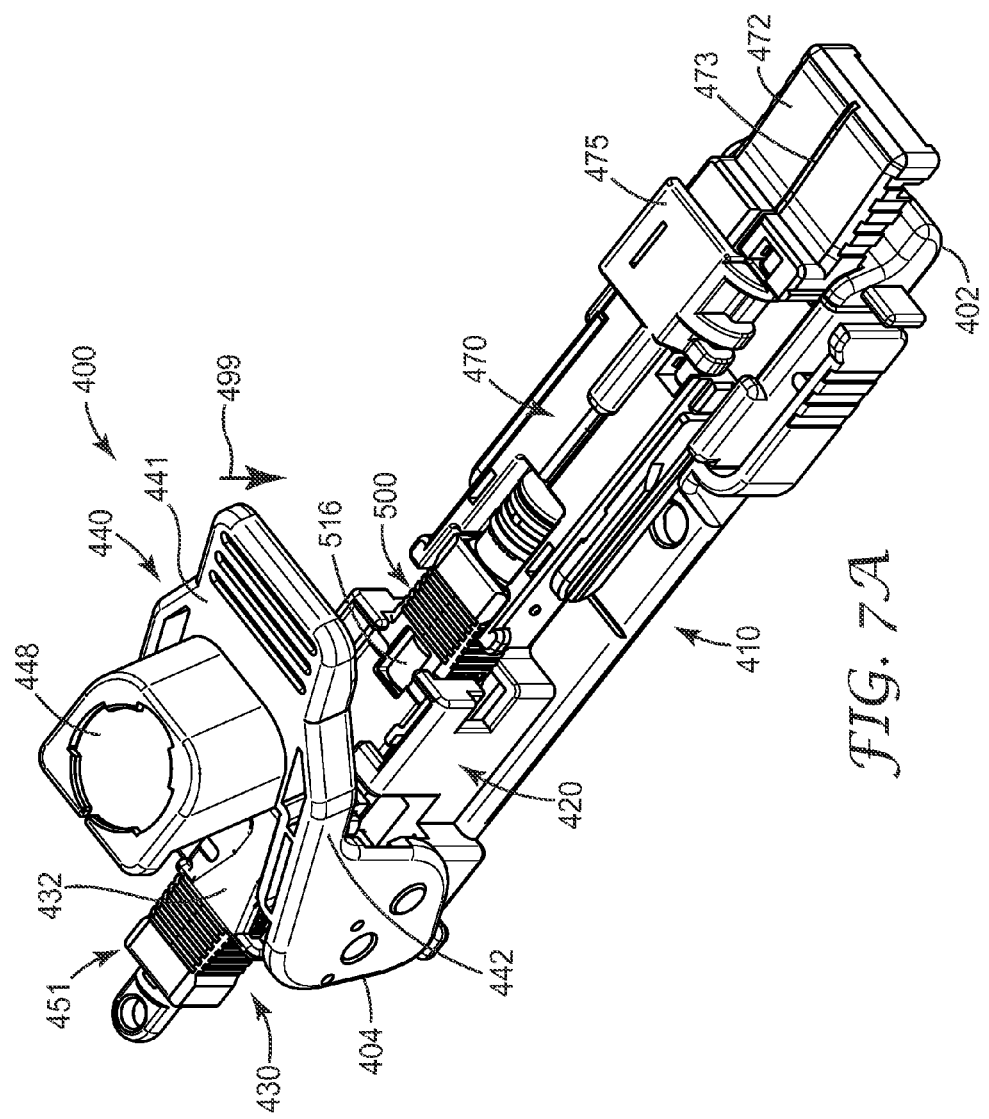

ASSEMBLY TOOL AND OPTICAL FIBER CONNECTOR ASSEMBLY METHOD

BACKGROUND OF THE INVENTION

1. Field of the Invention

The present invention is directed to an apparatus and method for assembling remote grip ferrule-based optical fiber connectors.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the end face of the ferrule by adhesively securing the fiber within the bore of the ferrule. A second class of connectors includes non-ferrule connectors, which rely on the buckling of a length of fiber to create contact pressure when mated to another connector or to a connector receptacle. Another class of connectors includes remote grip (ferruled) connectors, where the fiber is secured at some distance away from the terminal end or tip of the fiber.

When installing a remote grip connector in the field, one current practice uses a coplanar/flush polish which is done after the fiber is secured within an optical fiber connector. In remote grip connectors, as with other connector types, low optical losses and minimal reflections are achieved when the terminal ends of at least two optical fibers make secure physical contact. However, any differences in the coefficient of expansion between the fiber, the ferrule, etc. within the assembly may result in a non-contacting fiber tip when the temperature is raised or lowered. The resulting gap can lead to poor insertion loss and significant back reflection. Conventional remote grip connectors are described in U.S. Pat. No. 5,408,558 and U.S. Patent Publication No. 2008-0226236.

Another current practice involves a technician performing a field polish to create a fiber terminal end which protrudes slightly beyond the ferrule tip (i.e. the protrusion length of the fiber). This method of polishing remote grip connectors can produce a range of protrusion lengths that can provide a secure physical contact while avoiding excess force on the fiber tips.

Independent of whether using a flush polish, a protruding polish, or no polish, it is beneficial to secure the fiber so that the fiber tip protrudes a known amount. In the case where the fiber is polished after insertion, setting the protrusion and securing the optical fiber in the optical fiber connector, the amount of polishing needed can be minimized. In the case where no final polishing is done to the fiber, the protrusion setting step of the assembly process defines the final protrusion of the fiber from the end face of the connector ferrule. For example, a method of setting fiber protrusion is described in U.S. Pat. No. 7,194,179 and U.S. Patent Publication No. 2010/0316344.

Before inserting the fiber into a connector, the fiber is typically stripped and cleaved. Removing of any jacket material from the fiber optic cable and stripping away the buffer coating exposes the bare glass fiber which can then be fitted through a standard fiber optic connector ferrule. Cleaving provides an end face that can be nearly perpendicular to the axis of the fiber and reduces the amount of polishing required. In some applications, an angle cleave (e.g. of less than about 10°) can be used to improve the performance of the optical fiber connector. An appropriate cleave length (the distance between the fiber tip and the end of the polymer coating) is necessary to ensure that a sufficient amount of fiber can extend beyond the tip of the ferrule.

Viewing the glass fiber protruding from the end face of the ferrule prior to securing the fiber in the connector provides the assurance that the fiber has been successfully inserted through optical fiber connector.

SUMMARY OF THE INVENTION

According to an exemplary aspect of the present invention, an assembly tool for installing an optical fiber in an optical fiber connector is provided. The optical fiber connector includes a connector housing and a ferrule. The assembly tool includes a base having a connector mount disposed on a first end thereof and a cradle that holds a shaped ferrule disposed near the second end of the base, such that shaped ferrule is resiliently held within the cradle. The connector mount is configured to receive and secure the optical fiber connector to the base.

In an exemplary aspect, the shaped ferrule has an end face having a slot therein. The depth of the slot is used to set a protrusion length of a terminal end of the optical fiber, wherein the protrusion length corresponds to a distance that the terminal end of the optical fiber extends from an end of the connector ferrule. Alternatively, the shaped ferrule can have a stepped end face wherein the height of the step corresponds to the protrusion length of a terminal end of the optical fiber that extends from the end face of a connector ferrule after termination of the optical fiber connector.

The assembly tool can further include a cantilevered actuator arm pivotally mounted on the housing adjacent to the connector mount to engage a fiber securing mechanism in the optical fiber connector.

In an alternative embodiment, an assembly tool for installing an optical fiber in an optical fiber connector is provided. The optical fiber connector includes a connector housing and a connector ferrule. The assembly tool includes a base having a connector mount disposed on the base, a cradle that holds a shaped ferrule disposed near the second end of the base, and an actuation lever rotatably connected to the base such that the cradle is resiliently connected to the assembly tool. In addition, the actuation lever includes an inspection lens to visualize a terminal end of an optical fiber extending from an end face of a connector ferrule.

BRIEF DESCRIPTION OF THE DRAWINGS

The present invention will be further described with reference to the accompanying drawings, wherein:

FIG. 7A shows an isometric view of an assembly tool according to a second exemplary embodiment of the present invention;

Figure 1:
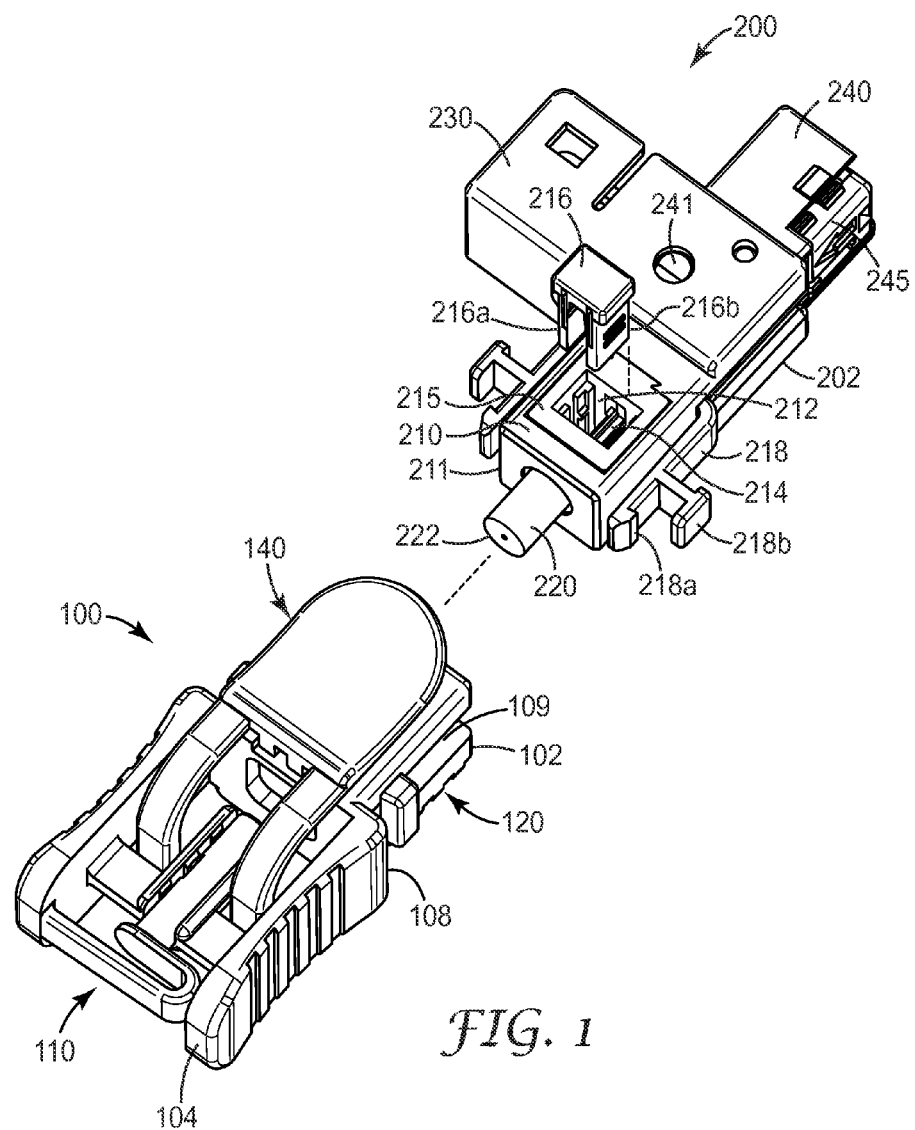
FIG. 1 shows an isometric view of an assembly tool according to an exemplary embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to an assembly tool 100 and method of installing an optical fiber in an optical fiber connector 200 as shown in FIG. 1, where the optical fiber is set to a predetermined fiber protrusion. Setting the amount of the fiber protruding from the end face of the connector ferrule can minimize and simplify or eliminate the final polishing step in the fiber optic connector installation process.

Figure 2A:
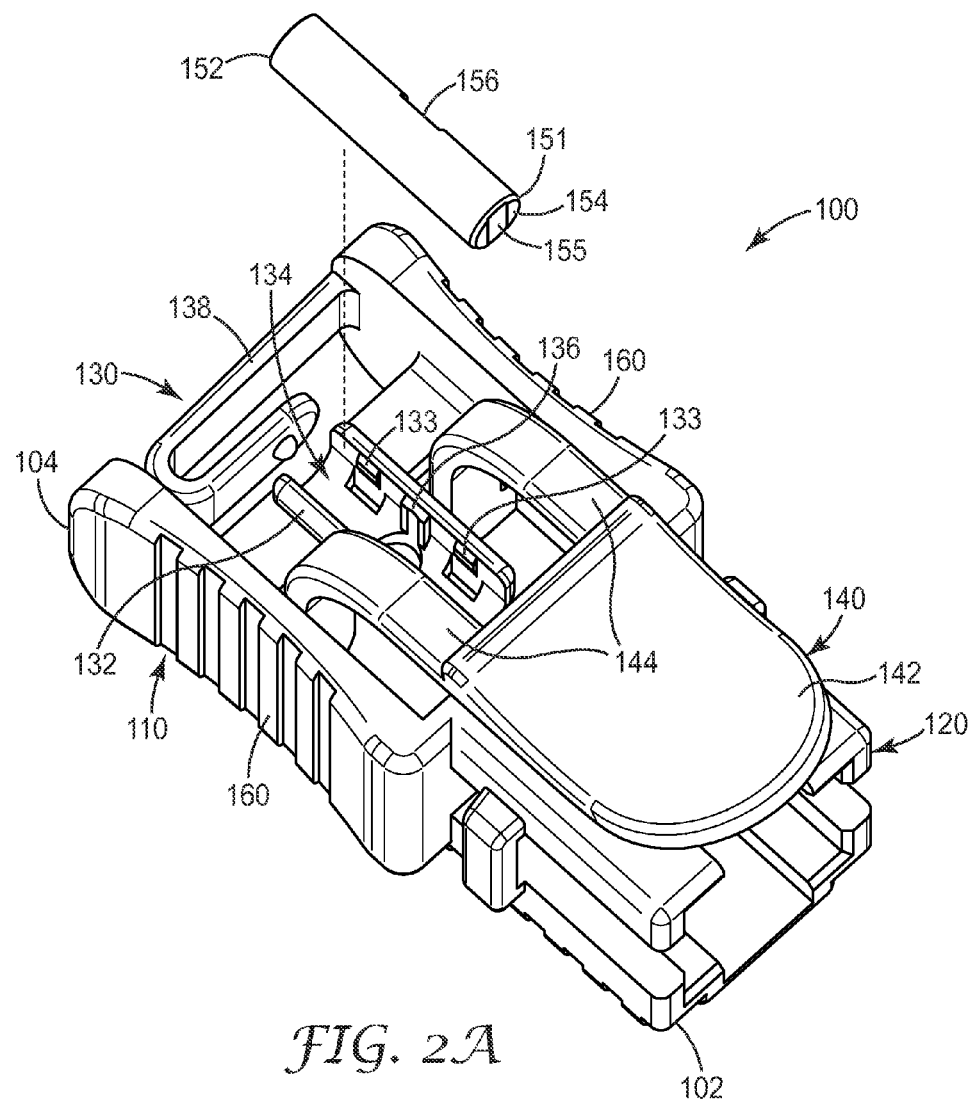
FIG. 2A shows an exploded isometric view of an assembly tool according to an exemplary embodiment of the present invention.
Figure 2B:
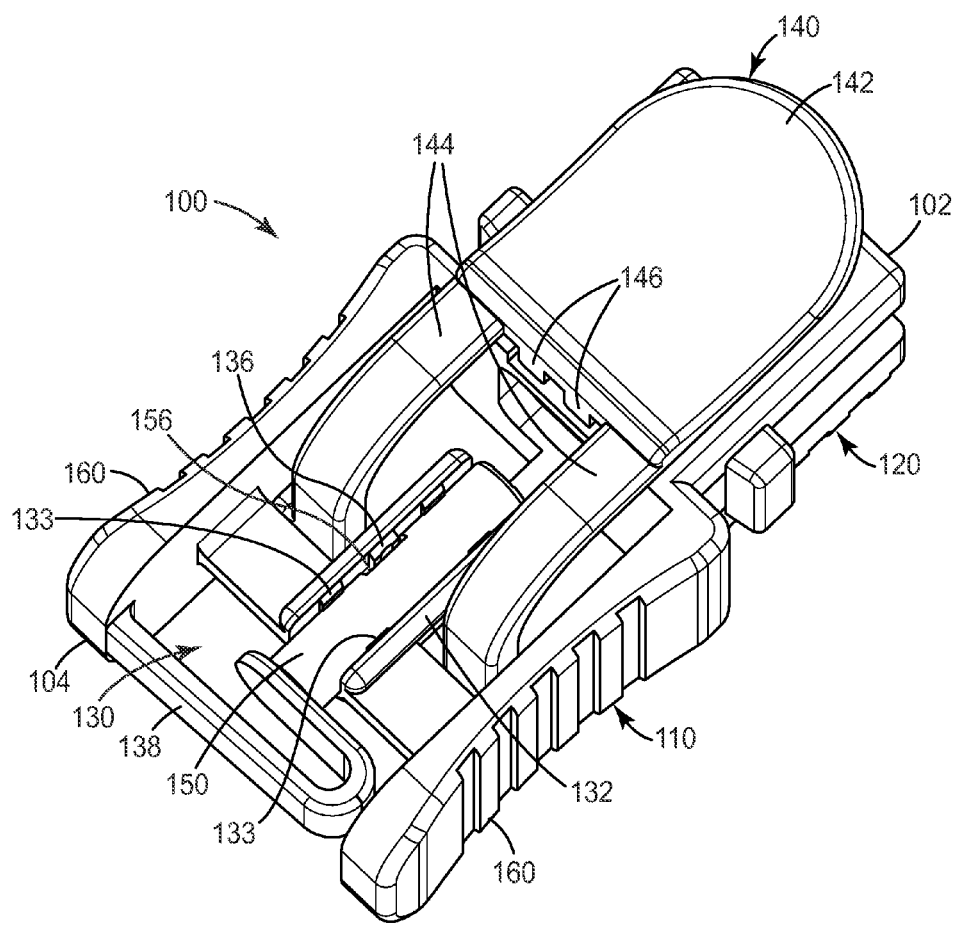
FIG. 2B shows an alternative isometric view of an assembly tool according to an exemplary embodiment of the present invention.

An exemplary assembly tool 100 for installing an optical fiber in an optical fiber connector 200 is shown with respect to FIGS. 1 and 2A-2B. This assembly tool provides for repeatable, accurate fiber insertion into a remote grip optical fiber connector and allows the setting of a precise protrusion length of fiber extending beyond the end face of the ferrule to simplify the installation process and help ensure stable optical performance of the resulting terminated optical fiber connector. The assembly tool can be made inexpensively to provide a low cost tool to the customer. According to an exemplary aspect of this embodiment, assembly tool 100 can be formed or molded from a plastic material, such as an injection molding process.

In an exemplary aspect, the assembly tool can be used to reliably set the length of fiber protruding from the end face of a ferrule of optical fiber connector 200, specifically a remote grip connector. Exemplary remote grip connectors are described in detail in U.S. Patent Publication No. 2008-0226236 and PCT Publication No. WO 2010/132187, both of which are incorporated by reference herein in their entirety. In an exemplary aspect, optical fiber connector 200 can have an SC format.

Referring to FIG. 1, an exemplary optical fiber connector 200 can include a connector body 202 having a front connector housing portion 210 that is configured to be received in a connector receptacle 300 (e.g., an SC coupling, an SC adapter, or an SC socket, FIGS. 5A5B), a connector ferrule 220 attached to a first end 211 of the front connector housing portion, a rear connector housing portion 230 attached to the front connector housing portion on an end opposite the connector ferrule and disposed at 90° relative to the front connector housing portion and a cable holding portion 240 pivotally attached to the rear connector housing portion. The cable holding portion is movable between an installation condition and a storage condition.

An alignment member 215 holds a gripping element 214 in a cavity 212 within the front connector housing portion 210 of the optical fiber connector. The gripping element secures and holds an optical fiber within the optical fiber connector when the gripping element is actuated by securing cap 216. In a preferred aspect, the gripping element 214 can be made from a sheet of ductile material having a focus hinge that couples two wall portions, where each of the wall portions includes a fiber gripping channel to optimize clamping forces for a conventional glass optical fiber received therein. The ductile material, for example, can be aluminum or anodized aluminum. Securing cap 216 is preferably configured to engage gripping element 214 between two legs 216a, 216b which extend from a top portion of the securing cap such that the gripping element securely grabs an optical fiber inserted therein when the securing cap is fully actuated over the gripping element (i.e. the walls of the gripping element are compressed between the two legs 216a, 216b of the securing cap). In operation, the securing cap 216 is moved from an open position to a closed or engaged position when pressed down over the gripping element.

Structurally, the connector ferrule 220 may be secured in the first end 211 of the front connector housing portion 210 by any known method (e.g. adhesive, snap fit, etc.). Connector ferrule 220 can be formed from a ceramic, glass, plastic, or metal material to support the optical fiber being inserted and terminated within the optical fiber connector. In a first exemplary aspect, connector ferrule 220 is a ceramic ferrule. The optical fiber being terminated in optical fiber connector can be a standard single mode or multimode optical fiber made of glass or can be a plastic optical fiber.

Figure 5A:
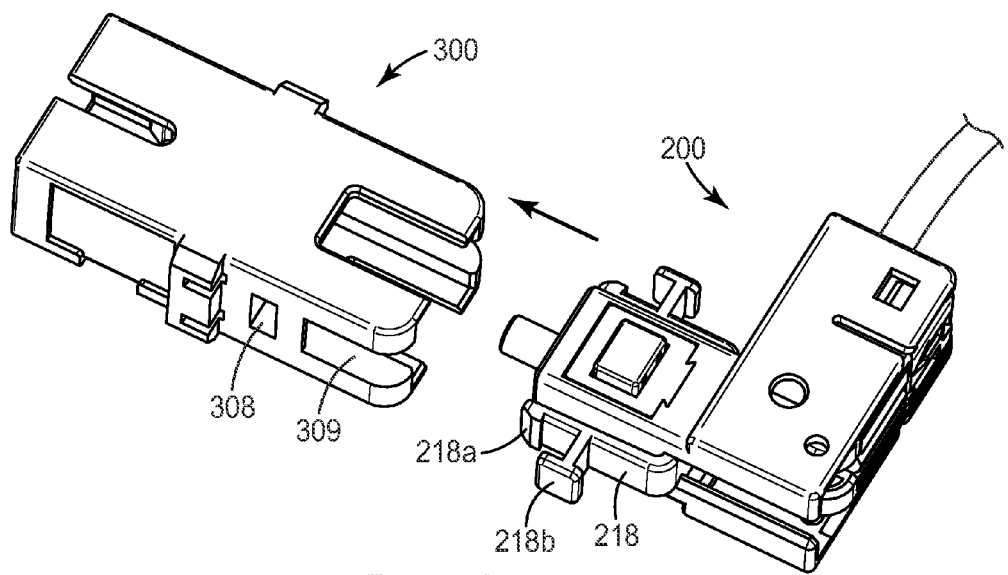
FIGS. 5A and 5B show the installation of a terminated optical fiber connector into a connector receptacle according to an exemplary embodiment of the present invention.
Figure 5B:
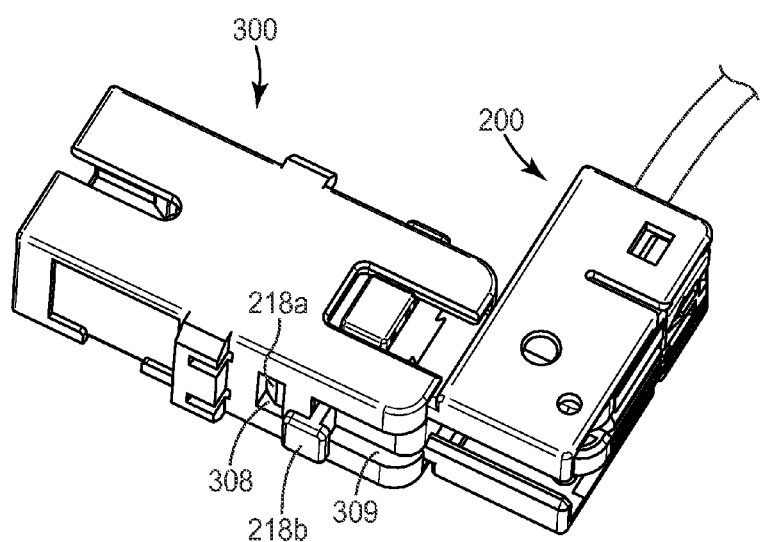

Optical fiber connector 200 can also include an attachment mechanism to enable positioning of optical fiber connector in the installation tool 100 (FIG. 1) and subsequent insertion and attachment of the optical fiber connector to a connector receptacle 300 (FIGS. 5A-5B). In an exemplary aspect, optical fiber connector 200 can include a pair of forward reaching locking arms 218 disposed on opposite sides of front connector housing portion 210 of the optical fiber connector as shown in FIG. 1. Each locking arm 218 includes a catch 218*a* disposed on the free end of the locking arms which engages with an opening 108, 308 in the installation tool 100 (FIG. 1) and connector receptacle 300 (FIGS. 5A and 5B), respectively. In addition, the optical fiber connector can have a gripping tab 218*b* attached to each of the locking arms to facilitate removal of the optical fiber connector from the installation tool or connector receptacle. The gripping tabs 218*b* can engage with slots 109, 309 in the installation tool 100 and connector receptacle 300, respectively, to provide initial alignment of the optical fiber connector 200 as the optical fiber connector is inserted into the installation tool or connector receptacle.

Referring to FIGS. 1 and 2A-2B, assembly tool 100 includes a base 110 having a connector mount 120 disposed on a first end 102 thereof. The connector mount can be configured to receive and secure the optical fiber connector 200 to the base such that the connector ferrule has a known orientation and position. The assembly tool further includes a protrusion setting portion 130 disposed near the second end 104 of the base and an actuation lever 140 attached to base 110. The protrusion setting portion 130 enables the craftsman to reliably set the protrusion or protrusion length of a terminal end of the optical fiber that extends from an end face 222 of the connector ferrule 220 of an optical fiber connector 200.

The protrusion setting portion 130 includes a cradle 132 to hold a shaped ferrule 150 disposed near the second end 104 of the base, wherein shaped ferrule is resiliently held within the cradle. The ferrule can move a finite amount in the lateral direction within the cradle to accommodate the insertion of the optical fiber connector in the connector mount 120 of assembly tool 100. The connector ferrule will apply a force in the insertion direction which is counter balanced in part by spring arm 138 disposed near the second end of the assembly tool.

Figure 3A:
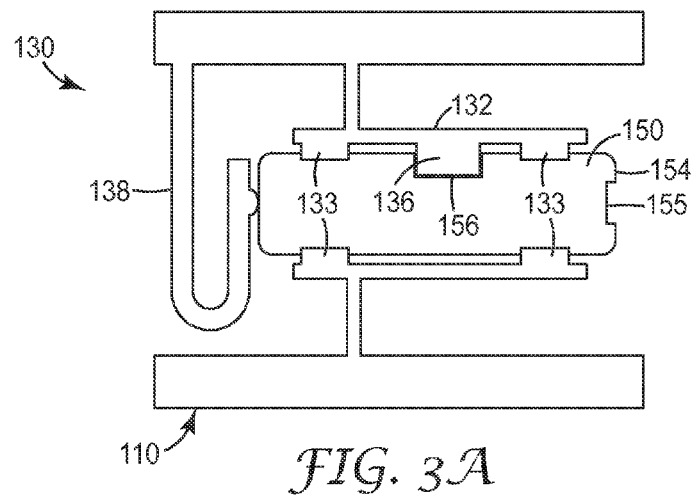
FIG. 3A shows a schematic diagram of a protrusion setting portion of an assembly tool according to an exemplary embodiment of the present invention.

Cradle 132 can have a partial cylindrical shell shape, e.g. a cylindrical annular section or segment, such that the shaped ferrule 150 can rest within the cylindrical shell and such that the cradle reliably positions the shaped ferrule relative to the connector mount at the first end of assembly tool 100. The cradle can include a plurality of retention tabs 133 which overhang hollow 134 of the cylindrical shell to retain the shaped ferrule within the hollow of the cradle and an alignment tab 136 located in the hollow of the cylindrical shell that cooperates with an alignment groove 156 on shaped ferrule 150 to control the orientation of the shaped ferrule within the cradle. FIG. 3A shows a schematic diagram of the protrusion setting portion 130 accentuating the small features of the cradle and the shaped ferrule that are not easily seen in the full isometric figures of the assembly tool.

Figure 3B:
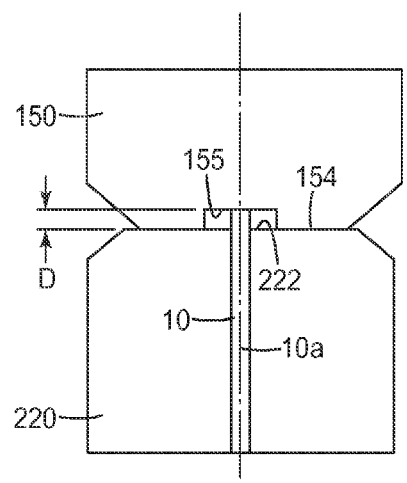
FIGS. 3B and 3C show two schematic diagrams of the shaped ferrule of an assembly tool contacting a connector ferrule during the termination process of an optical fiber connector according to an exemplary embodiment of the present invention.

The shaped ferrule 150 can be formed from a ceramic, glass, plastic, or metal material having a recessed portion 155 in the end face 154 of the shaped ferrule at a first end 151 thereof. The recessed portion can be a slot or a well of a preset depth wherein the depth of the slot corresponds to the protrusion length of fiber desired which extends from an end face of the connector ferrule of an optical fiber connector. FIG. 3B shows a schematic cross sectional view of the end of a shaped ferrule having a slotted end face used to set the protrusion of an optical fiber 10 in a connector ferrule 220 for a standard optical fiber connector (i.e. when the end face 222 of the ferrule is perpendicular to the axis 10*a* of the optical fiber 10). The protrusion length of the optical fiber is determined by the depth, D, of the slot or recessed portion 155 in the profile. In an exemplary embodiment, the depth of this slot can be in the range of about 20 microns to about 40 microns. With this initial protrusion set at this length, the terminal end of the optical fiber would protrude from the end face of the connector ferrule by about 14 microns to about 34 microns after final polishing of optical fiber connector.

Figure 3C:
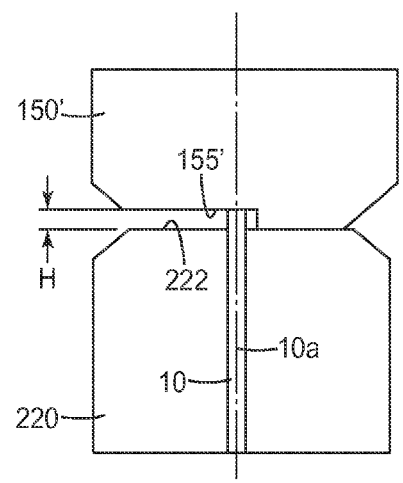

Alternatively, the shaped ferrule 150' can have a stepped end face 155'. FIG. 3C shows a schematic cross sectional view of the end of a shaped ferrule having a stepped end face used to set the protrusion of an optical fiber 10 in a connector ferrule 220 for a standard optical fiber connector (i.e. when the end face 222 of the ferrule is perpendicular to the axis 10*a* of the optical fiber 10). The protrusion length of the optical fiber is determined by the height, H', of the step in the end face profile of the shaped ferrule. In an exemplary embodiment, the height of this step can be in the range of about 20 microns to about 40 microns. With this initial protrusion set at this length, the terminal end of the optical fiber would protrude from the end face of the connector ferrule by about 14 microns to about 34 microns after final polishing optical fiber connector.

The alignment groove 156 can be disposed in a central portion of the shaped ferrule as shown in FIGS. 2A and 3A and can be oriented perpendicular to the longitudinal axis of the shaped ferrule so that the end face 154 of the shaped ferrule can be positioned in a known orientation when it is disposed in the hollow of cradle 132.

The protrusion setting portion also includes a spring arm 138 attached to the base 110 of assembly tool 100 to resiliently position the shaped ferrule 150 in the assembly tool during fiber installation to ensure good contact between the end face 154 of the shaped ferrule and the end face 222 of the connector ferrule 220 of optical fiber connector 200.

The connector mount or connector holder 102 can be configured to receive and secure optical fiber connector, such as connector 200, shown in FIG. 1, during the fiber termination procedure. For example, optical fiber connector 200 can be a remote grip connector. Such a connector is described in detail in US Patent Publication No. 2008-0226236 or PCT Publication No. WO 2010/132187, incorporated by reference herein in its entirety. In alternative aspects, the conventional connector 200 can include a Crimplok™ Connector available from 3M Company (St. Paul, Minn.). In an exemplary aspect, optical fiber connector 200 can have an SC format and the connector mount on the assembly tool will have a complementary format. In other aspects, the connector mount on the assembly tool can be configured to receive a connector having another standard connector format, such as an LC format or an FC format. In a further alternative, the connector mount can be configured to receive a connector having multiple fibers, such as an MT fiber connector.

The connector mount 120 can be integrally formed with the base of the assembly tool or it can be attached to the base 110 of the assembly tool 100 by a mechanical fastener, such as screws or snap catches. Alternatively, the connector mount 120 may be connected to the assembly tool by an adhesive or other bonding technique, such as welding. The connector mount 120 can be preferentially attached to the base 110 by a releasable fastener to allow for connector mount replacement when a different connector format is used.

Assembly tool 100 can further include an actuation mechanism that includes a cap actuation lever 140 that is configured to contact and press against the securing cap of optical fiber connector, such as securing cap 216 of the remote grip optical fiber connector 200 (see FIG. 1). For example, a pressing movement can be applied to actuation lever 140 to displace the lever towards the securing cap 216 until contact is made to actuate the gripping element 214 within the optical fiber connector. The actuation lever 140 can include a pressing platform attached to the terminal end of one or more cantilevered arms and one or more ridges extending from the lower surface of pressing platform to concentrate the force applied to securing cap to facilitate easier actuation of the gripping device or element.

Figure 6A:
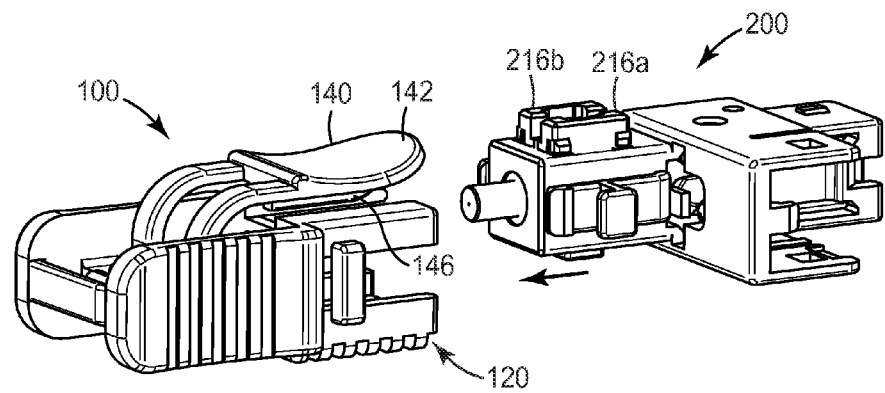
FIGS. 6A and 6B show how the assembly tool can be used to release the optical fiber from an optical fiber connector according to an exemplary embodiment of the present invention.
Figure 6B:
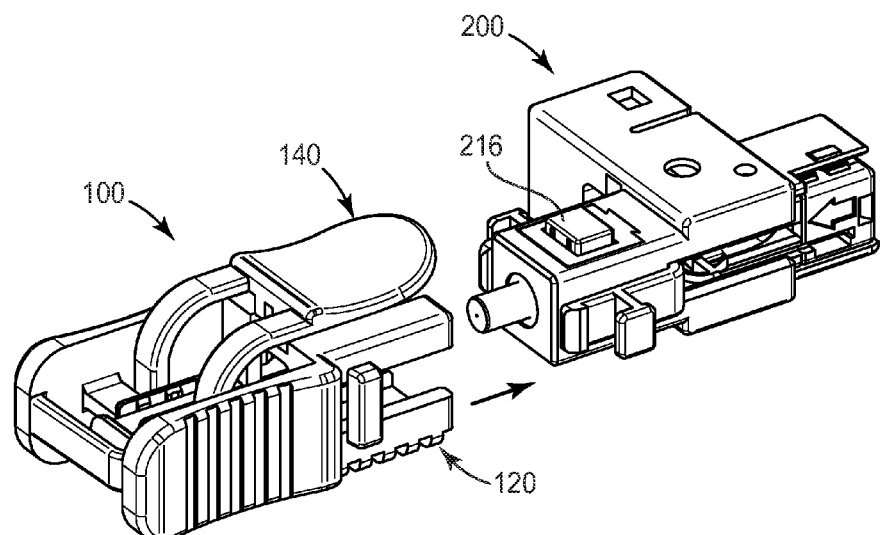

In one exemplary aspect, the assembly tool can also be used to release the gripping element by raising the security cap 216 as shown in FIGS. 6A and 6B. To deactivate the security cap 216 from optical fiber connector 200 and allow repositioning of the optical fiber, optical fiber connector 200 is inverted and inserted into connector mount 120 of assembly tool 100 as shown in FIG. 6A. The ridges 146 on the lower surface of pressing platform 142, engage with the legs 216a, 216b of the securing cap when the actuation lever 140 is pressed down. This action releases the cap from its actuated position allowing the resilient gripping member to open so that the optical fiber can be repositioned. Removing connector 200 from the assembly tool and re-inserting it back into the assembly tool 100 in its normal installation position (i.e. securing cap 216 side up, FIG. 6B) allows the reactivation of the actuation lever 140 once the fiber has been repositioned.

Referring to FIGS. 2A and 2B, base 110 of the assembly tool can further include a pair of gripping surfaces 160 on either side of protrusion setting portion to allow the assembly tool to be held securely between the thumb and forefinger during the fiber installation process.

In practice, a fiber termination process can utilize the assembly tool 100 to terminate an optical fiber in the field to an optical fiber connector 200 in a straightforward manner. In addition, the field technician can utilize an optical fiber connector that is fully assembled or nearly fully assembled in the factory, such that additional connector assembly is not necessary in the field.

FIGS. 4A-4E show an exemplary installation sequence to mount an optical fiber 10 in optical fiber connector 200. Cable holder 245 is attached to the optical cable 5 which is to be terminated by optical fiber connector 200 near the terminal end of the optical cable. Optical fiber cable 5 can be prepared by stripping the cable sheath to expose a length of optical fiber 10. The exposed optical fiber 10 is cleaned and then cleaved (flat or angled) to a predetermined length. The fiber jacket/plastic coating(s) can be stripped using a conventional mechanical fiber stripper. Cleaving can be accomplished using a conventional cleaver. In an alternative aspect the terminal end of the fiber cable may be prepared prior to attaching the cable holder to the cable.

Figure 4A:
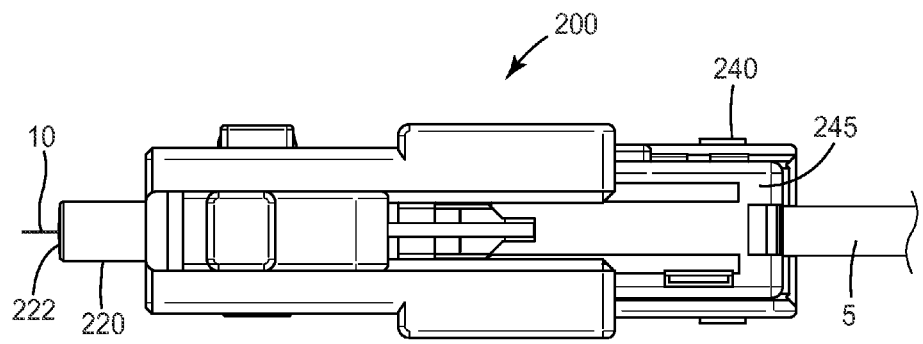
FIGS. 4A-4E illustrate the fiber optic connector termination process utilizing the assembly tool according to an exemplary embodiment of the present invention.

Once the cable holder is attached to the optical fiber cable 5 and the terminal end of the fiber has been prepared, optical fiber 10 is inserted into optical fiber connector 200 until the terminal end of the optical fiber 10 can be seen extending past the end face 222 of connector ferrule 220 as shown in FIG. 4A. Cable holding portion 240 is arranged in a longitudinal direction (e.g. in line with the connector ferrule), and the cable holder 245 is installed into cable holding portion 240.

Figure 4B:
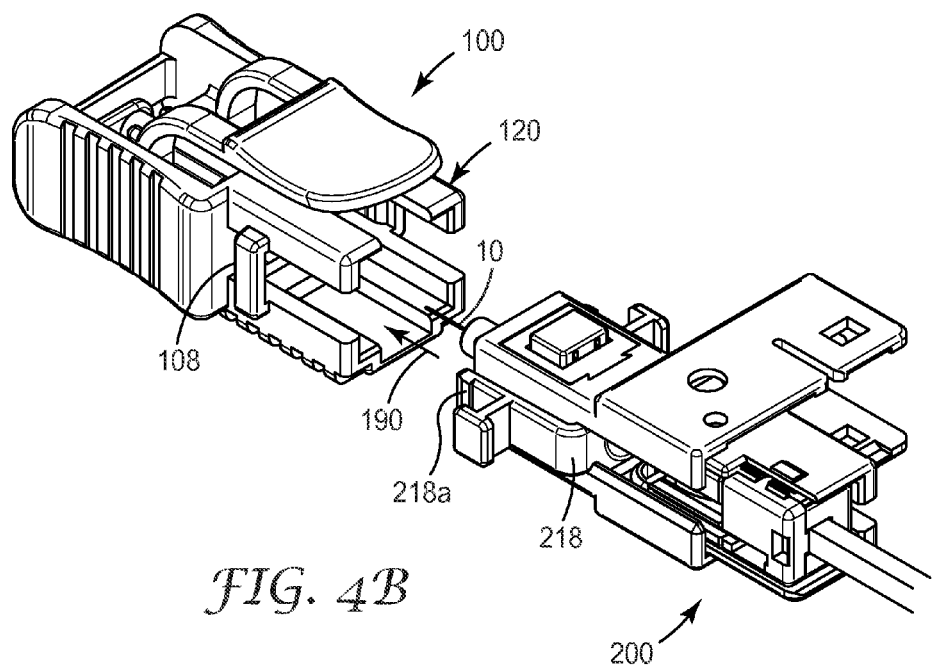

Optical fiber connector 200 can now be inserted, as shown by arrow 190 in FIG. 4B, into connector mount 120 of assembly tool 100 (e.g., by a snap fit). Proper positioning of the optical fiber connector in the assembly tool is confirmed when the catches 218a on the locking arms 218 of the optical fiber connector engage with opening 108 in the assembly tool 100 (e.g. via an audible click). As optical fiber connector is moved into the assembly tool, the terminal end of the optical fiber is pushed back toward the end face of the connector ferrule when the terminal end of the optical fiber contacts the shaped end face of the shaped ferrule. This pushing back of the optical fiber creates a small bow 12 (FIG. 4C) in the optical fiber within the optical fiber connector. The bow ensures adequate pressure is exerted on the terminal end of the optical fiber as it rests against the end face of the shaped ferrule 150 to ensure the proper protrusion length of fiber extending from the end face of the connector ferrule after termination.

Figure 4C:
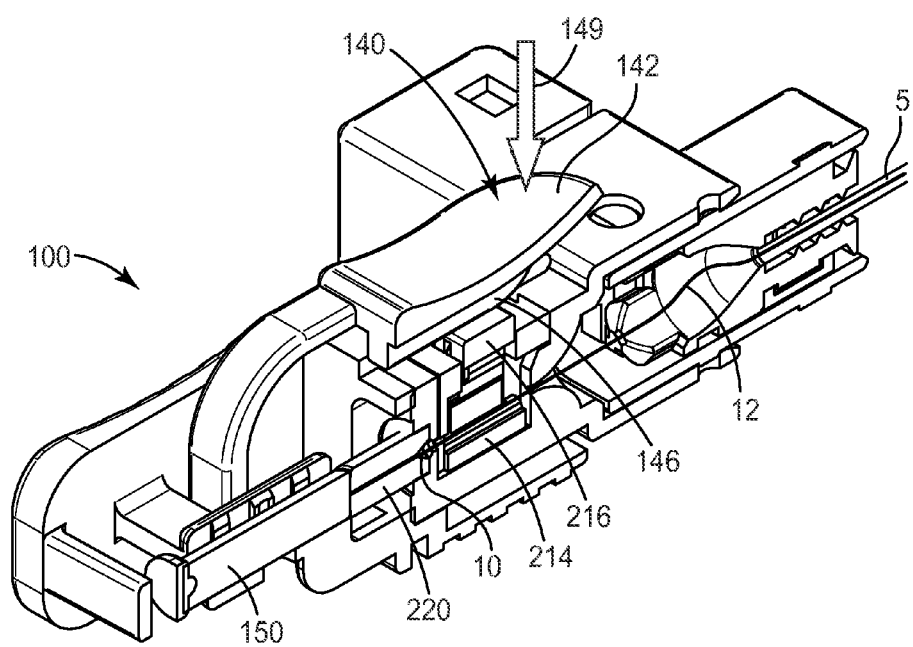
Figure 4D:
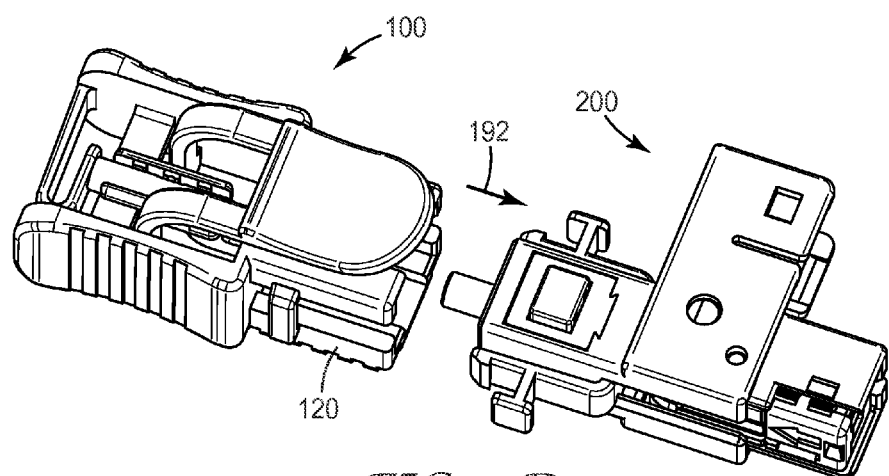
Figure 4E:
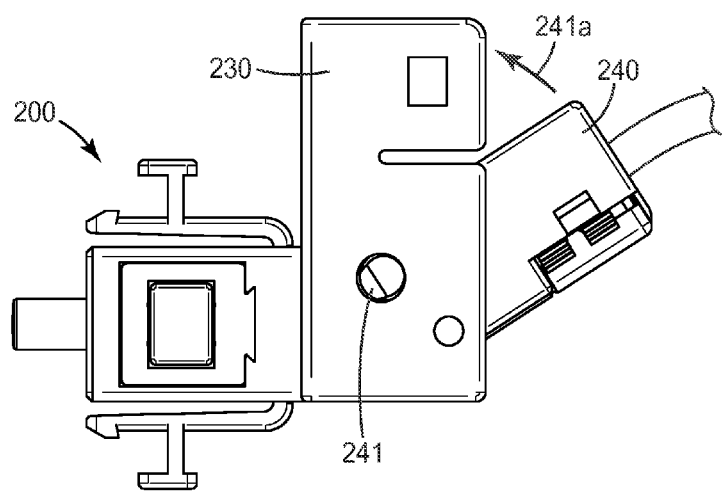

The actuation lever 140 is moved in a direction 149 by pressing the free end of the actuation lever to engage gripping element 214 with securing cap 216 in optical fiber connector as shown in FIG. 4C. This action locks the optical fiber 10 within connector 200.

A simplified polishing procedure, such as that described in PCT Publication No. WO 2010/088184, which is incorporated by reference herein in its entirety, can be used to finish the end of the optical fiber in order to optimize the optical transmission performance of the optical fiber connector.

The actuation lever and the bow in the optical fiber can now be released. The terminated connector can be removed from the connector mount 120 of assembly tool 100 in a direction opposite the insertion direction as indicated by arrow 192 in FIG. 4D. The cable holding portion 240 can now be rotated around pivot axis 241 (shown by arrow 241a in FIG. 4E) by an angle of about 90° and engaged with rear connector housing portion 230 of optical fiber connector 200. This completes the termination process of an optical fiber connector in accordance with the current invention.

The optical fiber connector 200 can now be inserted into a connector receptacle 300 (e.g., an SC coupling, an SC adapter, or an SC socket) as shown in FIGS. 5A and 5B to provide an optical connection when mated with a second optical fiber connector. The optical fiber connector is fully seated when the installer hears the audible click of the catches 218a on the locking arms 218 of the optical fiber connector engaging with opening 308 of the connector receptacle.

Figure 7B:
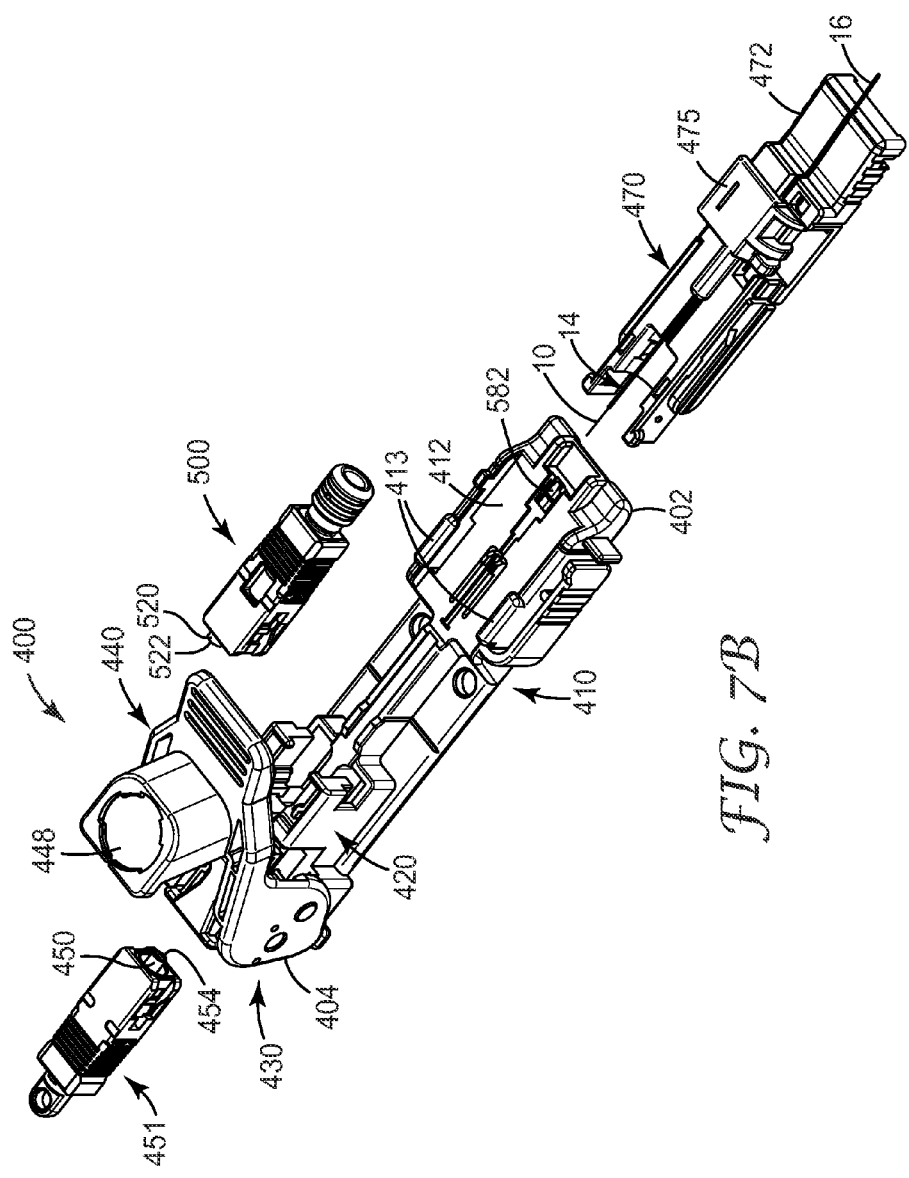
FIGS. 7B and 7C show two alternative isometric views of the exemplary assembly tool of FIG. 7A.

FIGS. 7A and 7B show another exemplary assembly tool 400 for installing an optical fiber in an optical fiber connector 500 wherein the protrusion of the optical fiber from the end face of the connector ferrule is set to a predetermined length prior to the securing of the optical fiber within the optical fiber connector. Thus, the exemplary assembly process can minimize, simplify or even potentially eliminate the final polishing step in the fiber optic connector installation process.

Assembly tool 400 provides for repeatable, accurate fiber insertion into a remote grip optical fiber connector and allows the setting of a precise protrusion length of fiber extending beyond the end face of the ferrule. The installer can verify the protrusion of the fiber prior to securing the optical fiber within the optical fiber connector by viewing the fiber through an inspection lens. Advantageously, the assembly tool can be made inexpensively to provide a low cost tool to the customer. According to an exemplary aspect of this embodiment, assembly tool 400 can be formed or molded from a plastic material, such as by an injection molding process.

In the exemplary embodiment shown in FIGS. 7A and 7B, assembly tool 400 can be used to reliably set the length of fiber protruding from the end face of a ferrule of optical fiber connector 500, specifically a remote grip connector. Such an optical fiber connector is described in detail in US Patent Publication No. 2008/0226236, incorporated by reference herein in its entirety. In alternative aspects, the optical fiber connector can be a Crimplok™ Connector available from 3M Company (St. Paul, Minn.). In an exemplary aspect, optical fiber connector can have an SC format. In other aspects, the protrusion setting apparatus can be configured to receive a connector having another standard connector format, such as an LC format or an FC format. In a further alternative, the optical fiber connector can be a multi-fiber optical fiber connector, such as an MT fiber connector. In addition, an exemplary optical fiber connector can have index matching gel, or fiber bow inside optical fiber connector between gripping element and ferrule. The terminal end of the optical fiber can be beveled or domed in either a pre- or post-assembly finishing operation.

Assembly tool 400 includes a base 410 having a connector mount 420 disposed near a second end 404 of the base, a protrusion setting portion 430 disposed adjacent the second end 404 of the base, and an actuation mechanism in the form of an actuation lever 440 rotatably attached to base 410. Optionally, the assembly tool can be used with a fiber holder assembly 470 that is slidably engageable with the base.

The connector mount 420 can be configured to receive and secure the optical fiber connector 500 to the base 410 of the assembly tool 400 such that the connector ferrule 520 (FIG. 7B) has a known orientation and position. The connector mount 420 can be integrally formed with the base of the assembly tool or it can be attached to the base 410 of the assembly tool 400 by a mechanical fastener, such as screws or snap catches.

Assembly tool 400 can further include an actuation mechanism that includes a cap actuation lever 440 that is configured to contact and press against the securing cap of optical fiber connector, such as securing cap 516 of the remote grip optical fiber connector 500 (see FIG. 7A). For example, a pressing movement indicated by directional arrow 499 can be applied to actuation lever 440 to displace the lever towards the securing cap 516 until contact is made to actuate the gripping element (not shown) within the optical fiber connector. The actuation lever 440 can include a pressing platform 441 mounted on the terminal end of spaced apart arms 442 which are rotatably connected to base 410 of the assembly tool. The pressing platform can have one or more ridges (not shown) extending from the lower surface of pressing platform to reach actuation cap 516 that is recessed from top surface of optical fiber connector and to concentrate the force applied to securing cap and facilitate easier actuation of the gripping device or element within the optical fiber connector.

Figure 10A:
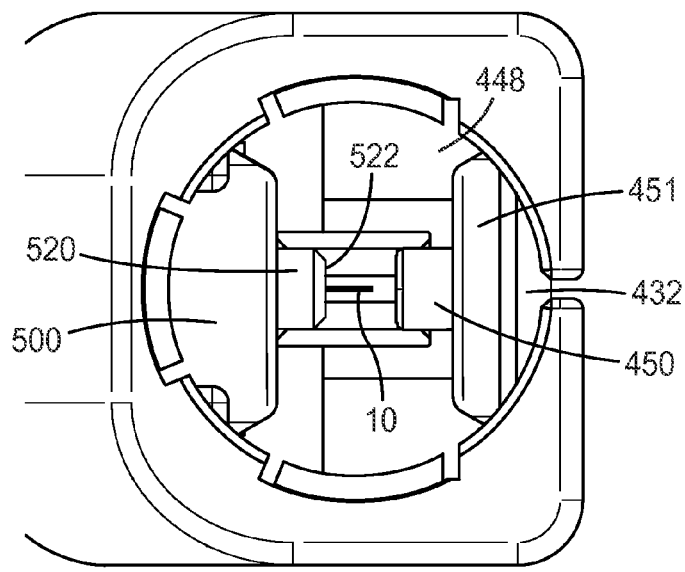
FIGS. 10A and 10B show a detailed top view through the lens of the end of the connector ferrule before and after actuation of the assembly tool.
Figure 10B:
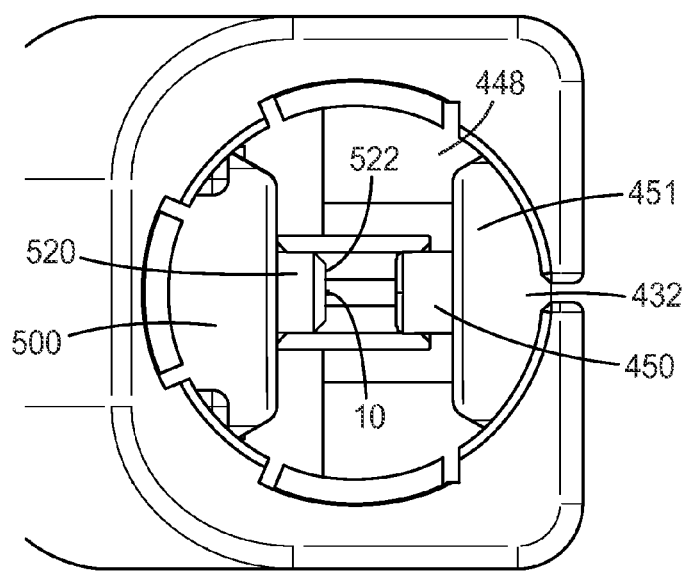

Additionally, the actuation lever can have an inspection lens 448 mounted thereon to allow visualization of the fiber before cap actuation to ensure that the optical fiber was properly inserted through the optical fiber connector. FIG. 10A shows a view through inspection lens 448 prior to cap actuation showing the optical fiber 10 extending from the end face 522 of the connector ferrule 520 of optical fiber connector 500 after the fiber is fully inserted into optical fiber connector. FIG. 10B shows a view through inspection lens 448 after cap actuation in which the optical fiber is pushed back into the connector ferrule 520 by the shaped ferrule 450 of the protrusion setting device 451 until the optical fiber 10 extends from the end face 522 of the connector ferrule 520 of optical fiber connector 500 by a known protrusion length. The inspection lens can be a glass lens or a plastic lens. An exemplary lens is available from Tokiwa Optical Corporation, Tokyo, JP (Part No. Top-114). Fiber protrusion before actuation can be larger than fiber protrusion after actuation so that craft person can easily spot the protruding fiber through the lens to ensure that the fiber has been properly inserted through the connector ferrule.

In an exemplary aspect, base 410 can have a pair of hinge pins 411 (FIG. 8C) disposed on either side of the protrusion setting portion 430 of the assembly tool near the second end 404 of the base. Each hinge pin 411 mates with a hole 443 (FIG. 8B) in the spaced apart arms 442 of the actuation lever 440 to provide a pivotal connection between the base and the actuation lever.

Figure 8A:
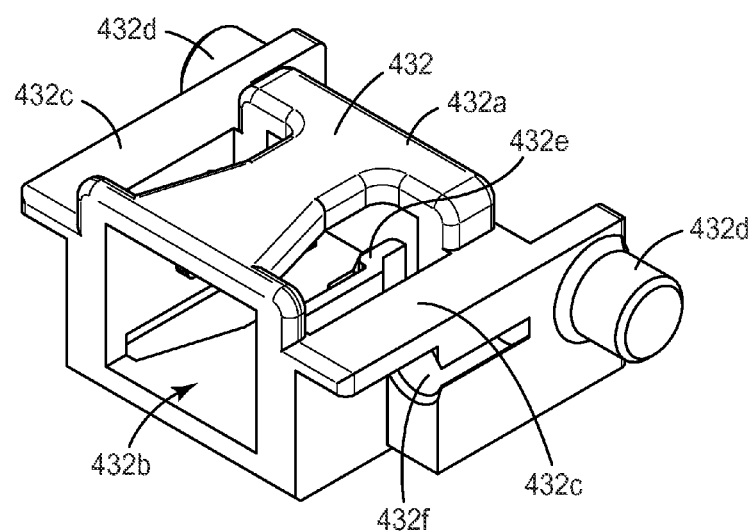
FIGS. 8A-8F show a number of detail views of several key components of the exemplary assembly tool of FIG. 7A.
Figure 8B:
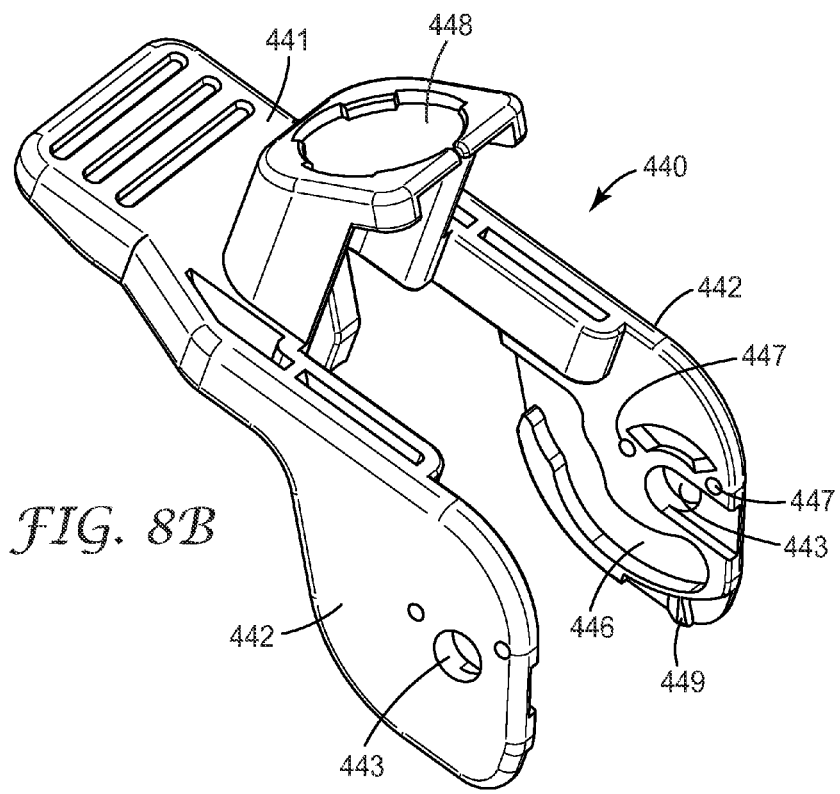
Figure 8C:
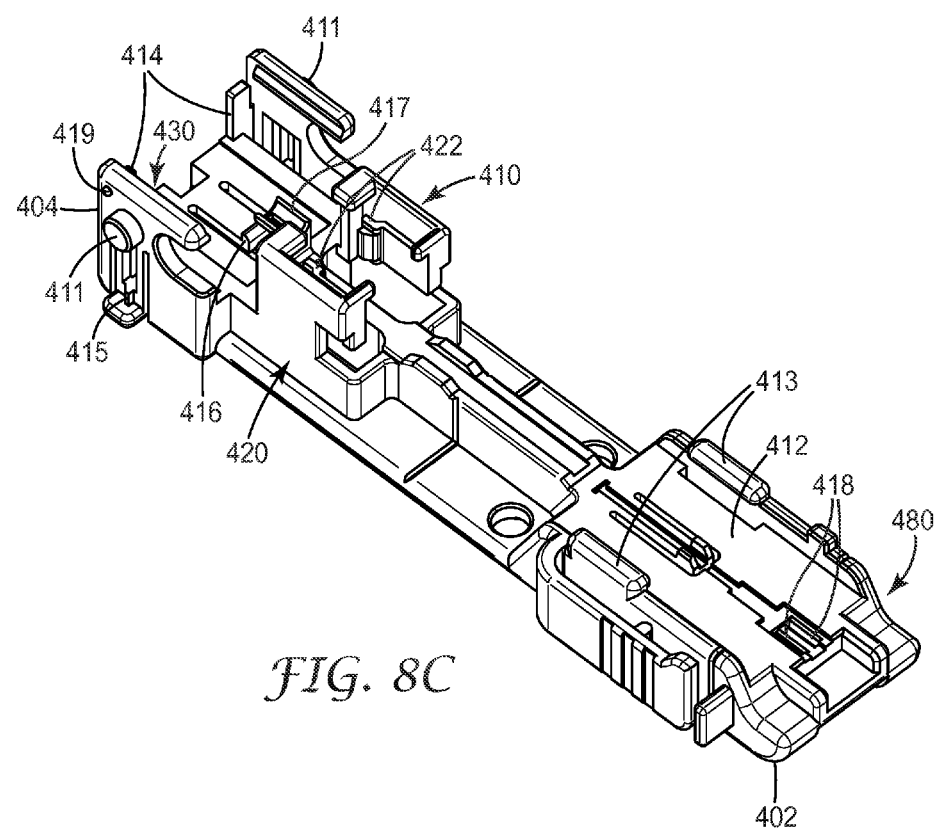
Figure 8D:
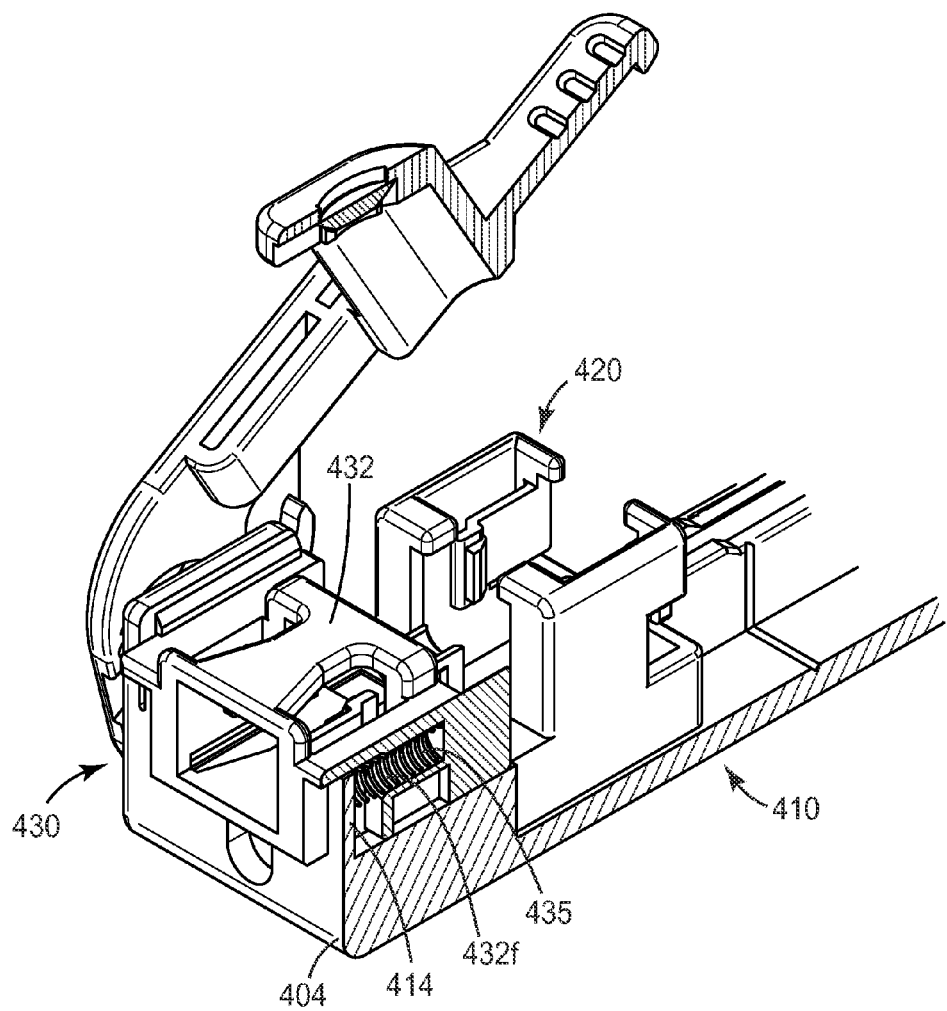
Figure 8E:
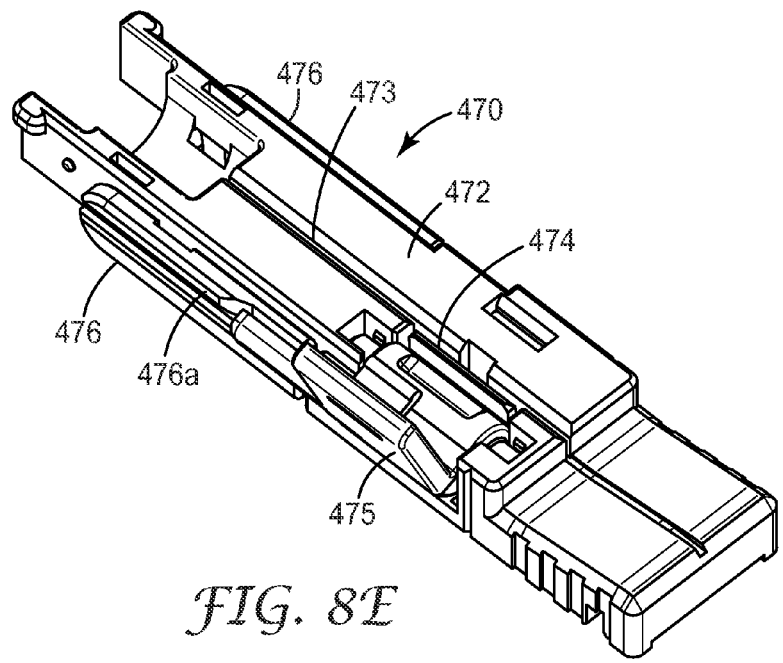
Figure 9:
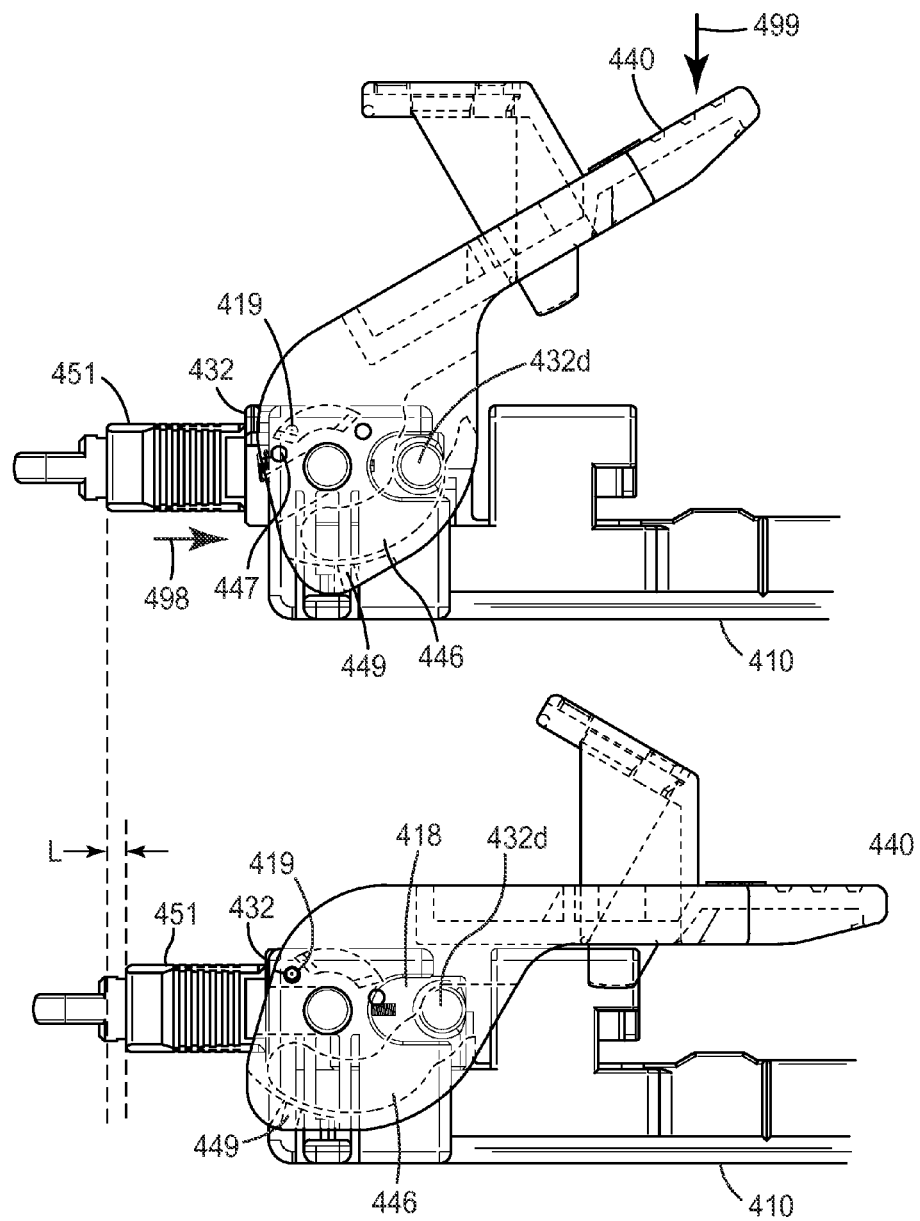
FIG. 9 shows the protrusion setting section of the exemplary assembly tool of FIG. 7A during actuation of the assembly tool.

Referring to FIGS. 8A-8B and FIG. 9, the actuation lever can have a cam 446 formed on the inside surface of each spaced apart arm 442 of actuation lever 440. The cams on the actuation lever act cooperatively with pins 432$d$ on the cradle 432 to move the cradle and the protrusion setting device 451 toward connector mount 420 (as indicated by directional arrow 498) by a controlled amount, L, when the actuation lever is pressed down (as indicated by directional arrow 499). Specifically, the cradle is pushed forward by one or more springs 435 (FIG. 8D) disposed between the base 410 and cradle 432 as the pins 432$d$ slide forward in cam 446 in the spaced apart arms of actuation lever 440. Specifically, the spring can be partly positioned in a holding cavity 432$f$ disposed in cradle's structural members 432$c$ on either side of cradle frame structure 432$a$. The second end of the spring abuts end stop 414 that extends generally perpendicular from the second end of the assembly tool base. The spring can be placed in this position in a compressed state such that when the actuation lever is depressed, the springs help push the cradle forward in the protrusion setting portion of the assembly tool. Additionally, the springs ensure an adequate force between the end faces of the shaped ferrule and connector ferrule during the gripping element actuation.

Actuation lever 440 can have a protruding stop 449 formed on the inside surface of at least one of the spaced apart arms 442 of the actuation lever that interacts with a catch 415 (FIG. 8C) on at least one side of the base of the assembly tool to position the actuation lever so that the terminal end of the optical fiber extending from the end face of the connector ferrule is at the appropriate focal length for inspection lens 448. In an exemplary aspect, the lens can be oriented substantially parallel with the optical fiber at this position so that whole length of the protruding fiber is in focus.

Additionally, actuation lever 440 can have a pair of depressions 447 formed on the inside surface of at least one of the spaced apart arm 442 of the actuation lever that interacts with a bump 419 on at least one side of base 410 of the assembly tool. The interaction of the bump and depression provides an audible click at each end of the stroke of actuation lever 440.

The protrusion setting portion 430 can be disposed adjacent to the second end of base 410 between the spaced apart arms 442 of actuation lever 440. The protrusion setting portion 430 enables the craftsman to reliably set the protrusion or protrusion length of a terminal end of an optical fiber extending from an end face 522 of the connector ferrule 520 of an optical fiber connector 500.

Protrusion setting portion 430 includes a ferrule alignment trough 417. The alignment trough helps position the optical fiber connector ferrule and the shaped ferrule of the protrusion setting device in optimal alignment to terminate an optical fiber connector having a predetermined amount of fiber protruding from the end face of the connector ferrule.

Additionally, the protrusion setting portion 430 includes a cradle 432 to hold a protrusion setting device 451 which includes a shaped ferrule 450 disposed near the second end 404 of the base 410. The cradle 432 is resiliently held within the protrusion setting portion of the assembly tool. In this way, the shaped ferrule can move a finite amount in the lateral direction with respect to the assembly tool to accommodate the insertion of the optical fiber connector 500 in the connector mount 420 of assembly tool 400. The connector ferrule applies a force in the insertion direction which is counter balanced by one or more springs 435 that resiliently position the cradle (and hence the protrusion setting device holding the shaped ferrule 450) in the assembly tool during fiber installation and ensure good contact between the end face 454 of the shaped ferrule 450 and the end face 522 of the connector ferrule 520 of optical fiber connector 500.

Figure 11:
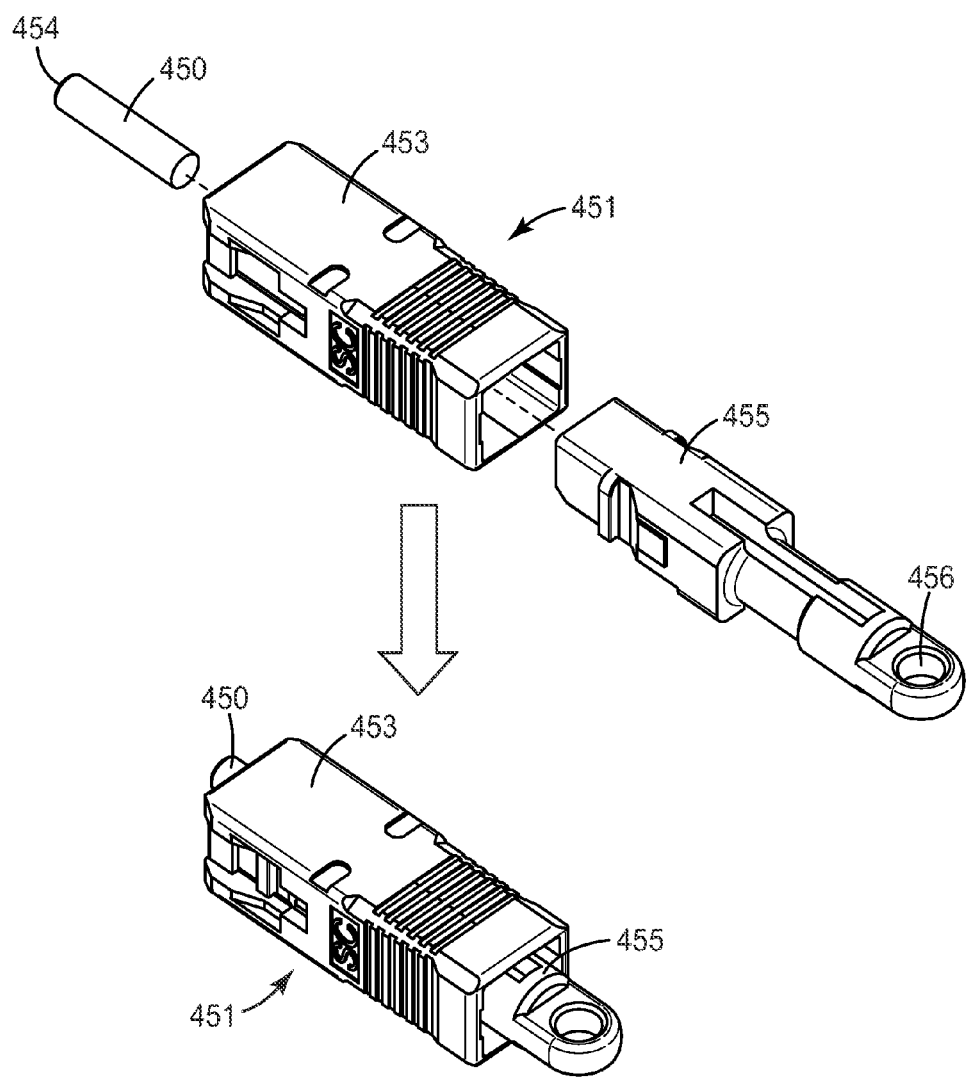
FIG. 11 shows n exemplary protrusion setting device that is useable with the assembly tool of FIG. 7A.

Protrusion setting device 451 has an outer housing 453 configured to mate with cradle 432 in the protrusion setting portion 430 of the assembly tool as shown in FIG. 11. The outer housing can have the same fundamental form factor as the optical fiber connector which it will be used with in assembly tool 400. Thus if the assembly tool is designed to terminate a SC format optical fiber connector, the protrusion setting device can have a similar form factor. If the assembly tool is to be used to terminate an LC format connector the protrusion setting device can have a similar form factor that is similar to the LC connector. Of course the connector mount and the cradle would be changed to accommodate the optical fiber connector and protrusion setting device to be installed therein. To prevent installation of the optical fiber connector into the cradle rather than the connector mount, the protrusion setting device and the corresponding cradle do not have the external keying features that are common in many optical fiber connectors. For example, an SC format optical fiber connector has a rib formed on the external surface of outer housing, and the corresponding connector mount would have a slot to accept the connector rib. However, protrusion setting device does not have the rib on its outer housing and as a result, the cradle does not have a slot for the rib. In this way the craftsman is prevented from installing the optical fiber connector in the cradle of the assembly tool because the SC format optical fiber connector could not be properly seated in the cradle.

Referring to FIGS. 7A and 11, the outer housing 453 of the protrusion setting device 451 surrounds and holds backbone 455 which in turn hold shaped ferrule 450 in one end thereof. The outer housing is slidably attached to the backbone so that engaging and disengaging of the protrusion setting device can be performed in the same manner to a standard optical fiber connector such as a, SC optical fiber connector shown in the figures. The shaped ferrule can be adhesively bonded or press fit into the backbone. The backbone can be held within the outer housing by a mechanical latch, interference fit or adhesive. In one exemplary aspect, the backbone can have an eyelet formed on the end opposite the shaped ferrule. The eyelet can be used to tether the protrusion setting device to the assembly tool via a cord or wire to prevent its being misplaced in the field. The design of protrusion setting device 451 facilitates handling of the shaped ferrule 450, for example, so that the end face 454 of the shaped ferrule can be removed from the assembly tool 400 and cleaned prior to using the assembly tool to mount an optical fiber connector 500 on the terminal end of an optical fiber 10.

A detailed view of cradle 432 is shown in FIG. 8A. Cradle 432 has a frame structure 432a having a central passage 432b to accommodate the insertion of the protrusion setting device 451 within the central passage. The cradle can have a pair of latch arms 432e or other securing mechanism within the central passage of the cradle to securely hold the protrusion setting device in the cradle. Cradle 432 can have a pair of structural members 432c disposed on opposite sides of frame structure 432a. A pin 432d can be disposed on each structural member 432c which mates with cam 446 (FIG. 8B) formed on the inside surface of actuation lever 440 and allows the cradle and the protrusion setting device 451 to be moved toward connector mount by a controlled amount.

The shaped ferrule 450 can be similar to the shaped ferrule 150, 150' previously described with reference to FIGS. 3A-3B. The end face 454 of the shaped ferrule can have a recessed portion in the form of a slot, well or stepped end face of a preset depth wherein the depth of the slot corresponds to the protrusion length of fiber desired which extends from an end face of the connector ferrule of an optical fiber connector. The protrusion length of the optical fiber is determined by the depth of the slot or recessed portion or the height of the step formed in the end face of the shaped ferrule.

Figure 7C:
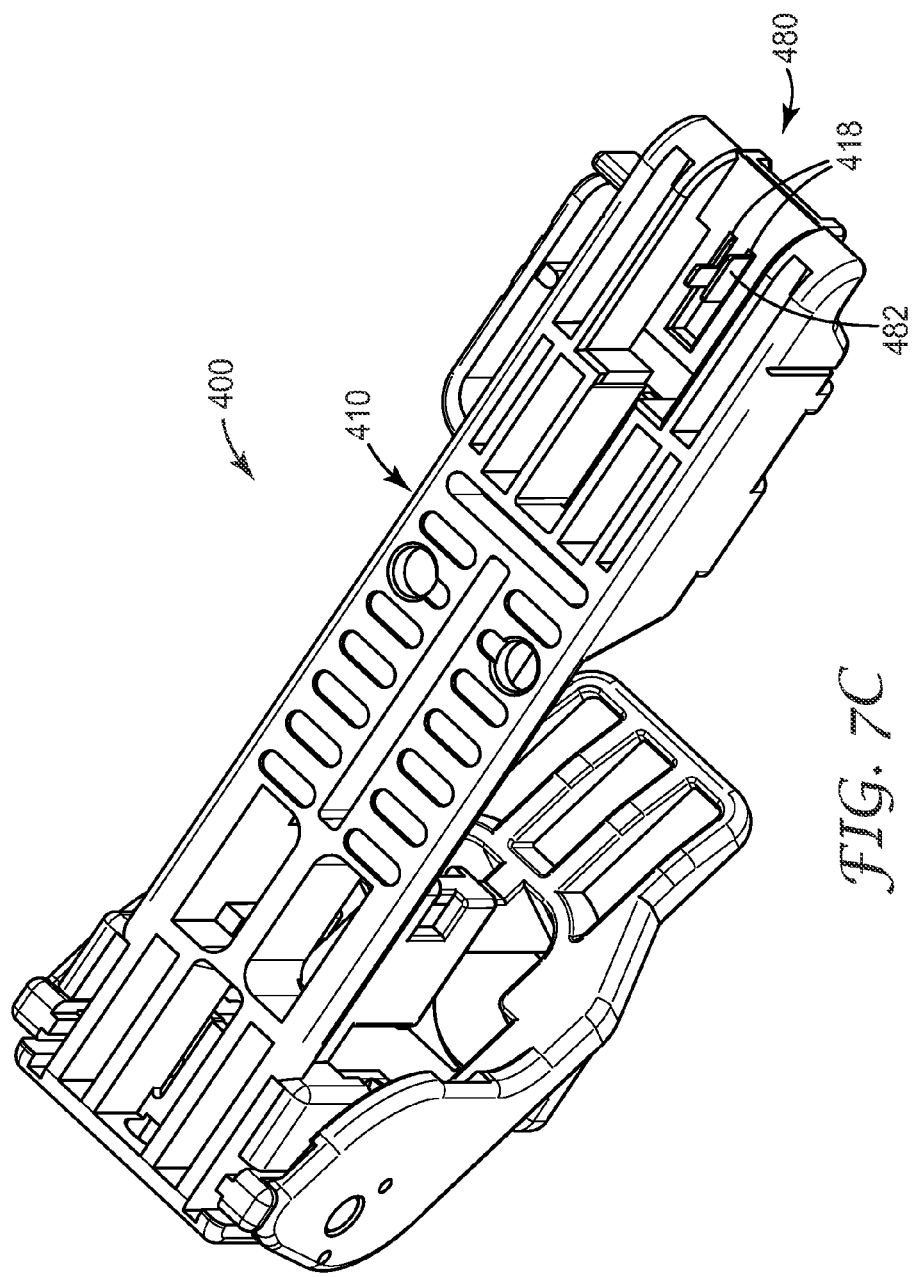

In one exemplary aspect, the assembly tool 400 can also be used to release the gripping element by raising the securing cap 516 using a blade 482 shown in FIGS. 7B and 7C. The blade can be formed from a stamped piece of sheet metal and bent into a U-shape. The blade is inserted through slots 418 (FIG. 8C) formed through base 410 in cap removal station 480 near the first end 402 of the base so that the blade extends from the bottom surface of the cap removal station. The blade can be held in the slots 418 by an interference or friction fit. To deactivate the securing cap from optical fiber connector and allow repositioning of the optical fiber, the assembly tool is inverted and the optical fiber connector is inserted into cap removal station 480. The blade 482 of the cap removal station can engage with the securing cap when optical fiber connector is pushed against the blade. This action releases the cap from its actuated position allowing the resilient gripping member to open so that the optical fiber can be repositioned.

Assembly tool 400 can also include a fiber holder assembly 470 having a fiber holder assembly base 472. In a preferred aspect of this embodiment, the fiber holder assembly base 472 is configured to be slidably received in guide channel 412 of the assembly tool base 410. According to an exemplary aspect of this embodiment, assembly tool base 410, fiber holder assembly 470, and components thereof, can be formed or molded from a polymer material. Advantageously, the fiber holder can facilitate the handling of 250 micron coated optical fiber 14 (FIG. 7B) or other sub-millimeter diameter optical fiber construction by helping to support, hold and guide the optical fiber during termination of an optical fiber connector using the exemplary assembly tool described herein. A typical 250 micron coated optical fiber includes the central glass optical fiber having a typical diameter between 100-125 microns which has been coated with a polymer buffer coating 16 up to a total diameter of about 250 microns.

As shown in FIGS. 7A-7B and FIGS. 8E-8F, fiber holder assembly 470 includes a fiber guiding channel 473 disposed longitudinally in fiber holder assembly base 472. At least a portion of the fiber guiding channel has a flexible wall structure 474 that is designed to secure the optical fiber in the fiber guiding channel when clamping cover 475 is locked in a closed position over the fiber guiding channel. The fiber guiding channel and clamping cover are provided to support and temporarily secure the optical fiber during the optical fiber connector termination process. In an exemplary aspect, clamping cover 475 can have a protective tube portion 475a extending over an additional section of the fiber guiding channel to improve buckle resistance of the optical fiber as the fiber is inserted into the optical fiber connector and to optimize the bow length of the optical fiber during the optical fiber connector termination process.

Figure 8F:
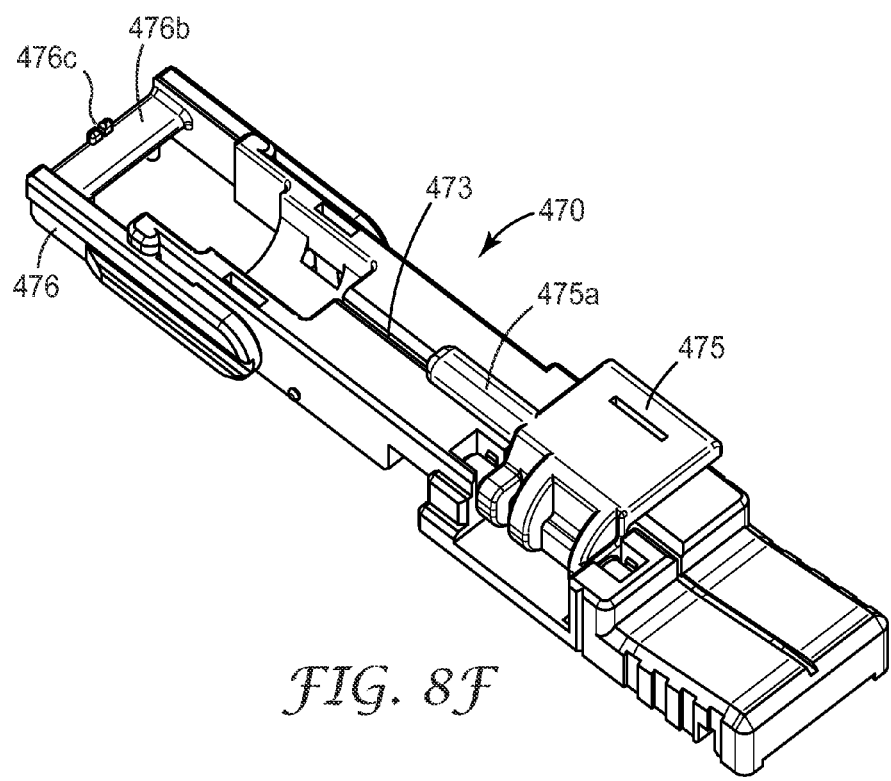

In addition, fiber holder 470 can include a cleaving guide 476. The cleaving guide may be extended during the fiber preparation step of the assembly process as shown in FIGS. 8F and 12B. For example, when a 250 micron coated optical fiber 14 is placed in fiber guiding channel 473, the stripped bare glass portion of optical fiber 10 extends beyond the end of cleaving guide 476. Optical fiber 10 rests in notch 476b which controls the lateral position of the optical fiber during cleaving. Once 250 micron coated optical fiber 14 is secured in the fiber holder by closing clamping cover 475, optical fiber to can be cleaved with crossbar 476 serving as a guide for the blade of the cleaver to ensure that the optical fiber is cut to the desired length. Once the optical fiber has been cleaved, the cleaving guide can be rotated out of the way as indicated by directional arrow 496 in FIG. 12B. Fiber holder 470 (FIG. 8E) is now ready to be inserted into the assembly tool to continue the assembly process.

The base 410 further includes guide rails 417 that can be configured to slightly overhang guide channel 412 to ensure proper positioning of the fiber holder in the assembly tool and to help prevent the fiber holder assembly base 472 from rising out of guide channel 412 during fiber bowing.

In practice, a fiber termination process can utilize the assembly tool 400 to terminate a 250 micron coated optical fiber 14 in the field to an optical fiber connector 500 in a straightforward manner. In addition, the field technician can utilize an optical fiber connector that is fully assembled or nearly fully assembled in the factory, such that additional connector assembly is not necessary in the field.

Figure 12A:
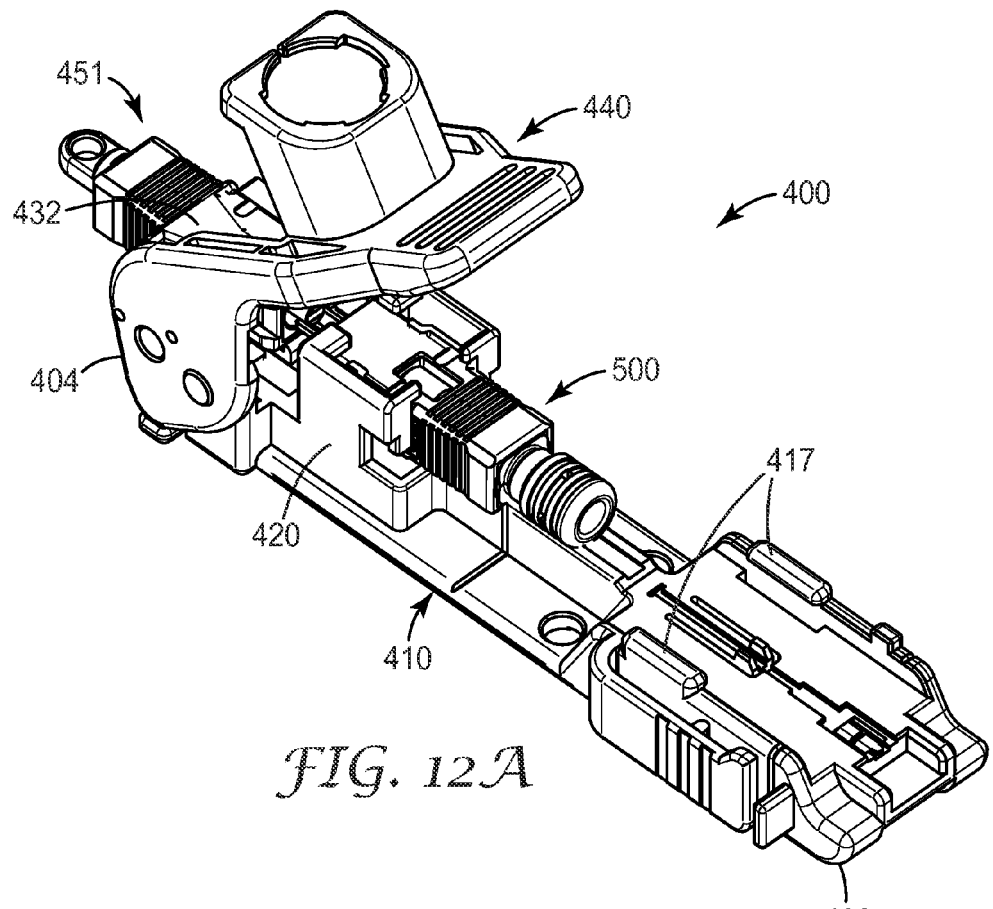
FIGS. 12A-12F illustrate the fiber optic connector termination process utilizing the assembly tool of FIG. 7A.
Figure 12B:
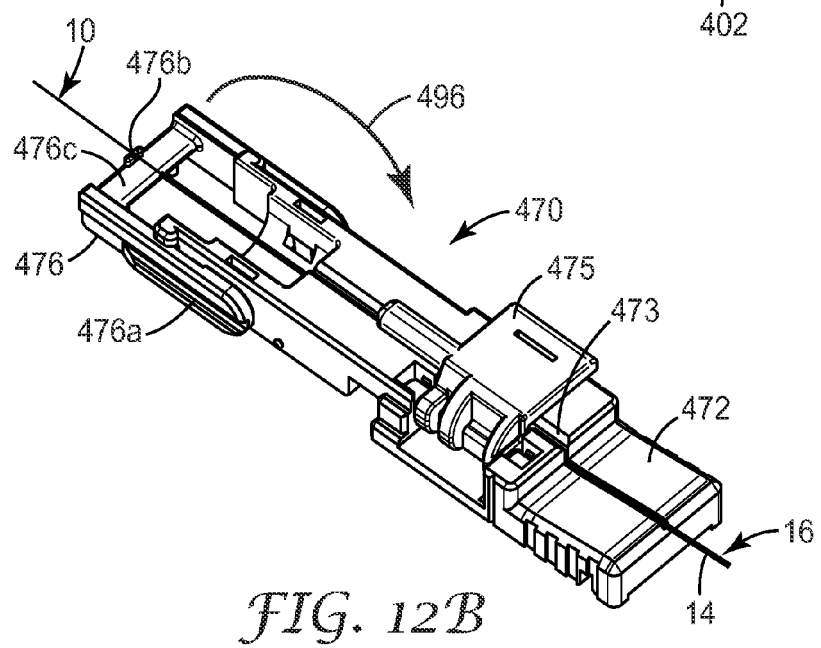

FIGS. 12A-12F show an exemplary installation sequence to mount an optical fiber 10 in optical fiber connector 500. The end face of the shaped ferrule is cleaned and protrusion setting device 451 is inserted into the cradle 432 located near the second end 404 of the base of assembly tool 400 as shown in FIG. 12A. The optical fiber connector 500 to be terminated can be installed into connector mount 420 which is disposed on the base of the assembly tool.

Referring to FIG. 12B, the 250 micron coated optical fiber 14 is placed in fiber guiding channel 473 disposed longitudinally in fiber holder assembly base 472 of the fiber holder assembly 470 and secured in place when clamping cover 475 is locked in a closed position over the fiber guiding channel. The 250 micron coated optical fiber 14 can be prepared by stripping the polymer buffer coating 16 at the terminal end of the 250 micron coated optical fiber to expose a length of optical fiber 10. The exposed optical fiber 10 is cleaned. Cleaving guide 476 can be extended by pivoting to a forward position and then optical fiber 10 can be cleaved (flat or angled) to a predetermined length. The cleaving guide is then restored to its storage position as indicated by directional arrow 496. The fiber jacket/plastic coating(s) can be stripped using a conventional mechanical fiber stripper. Cleaving can be accomplished using a conventional cleaver. In an alternative aspect the terminal end of the fiber cable may be prepared prior to attaching the cable holder to the cable.

Figure 12C:
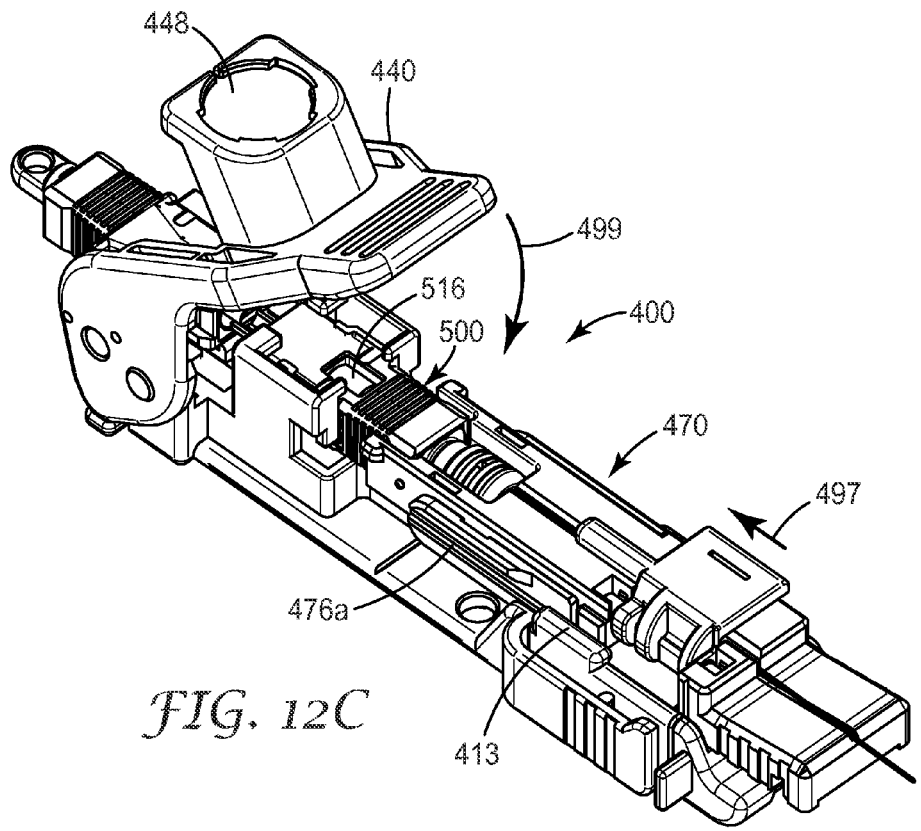

Once the 250 micron coated optical fiber 14 has been prepared, the fiber holder assembly 470 is slidably engaged with the base 410 of the assembly tool 400 as shown in FIG. 12C. The runners 476a of the fiber holder assembly interact with guide rails 417 on the base of the assembly tool to ensure proper positioning of the terminal end of optical fiber 10 as it is inserted into optical fiber connector 500. As the fiber holder assembly is slid forward in the assembly tool, the terminal end of optical fiber 10 is inserted into optical fiber connector 500 until the terminal end of the optical fiber 10 can be seen extending past the end face 522 of connector ferrule 520 as viewed through inspection lens 448 mounted on the actuation lever 440 of the assembly tool as shown in FIG. 10A. Once the terminal end of optical fiber 10 is in the correct position, actuation lever 440 of the assembly tool is pressed downward indicated by directional arrow 499. The actuation lever 440 to displace the lever towards the securing cap 516 of optical fiber connector 500 until contact is made and the cap is pressed over the gripping element (not shown) to secure the optical fiber within optical fiber connector.

Figure 12D:
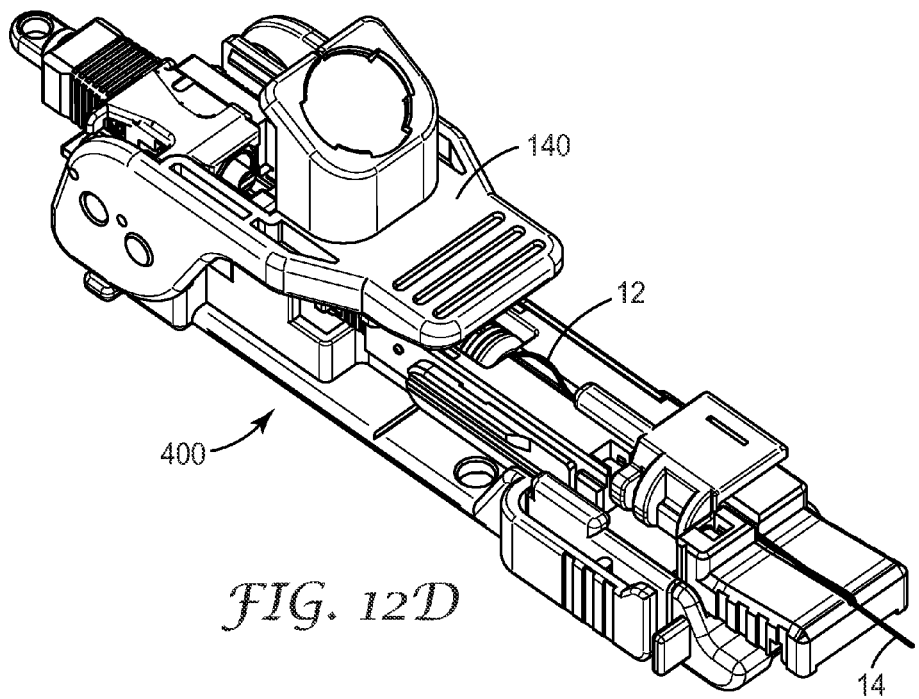

FIG. 12D shows assembly tool 400 just prior to the final actuation of the securing cap. A small bow 12 has formed in the 250 micron coated optical fiber 14. The bow confirms that the optical fiber has been pushed back in the optical fiber connector by shaped ferrule of the protrusion setting device. The bow ensures adequate pressure is exerted on the terminal end of the optical fiber as it rests against the end face of the shaped ferrule of the protrusion setting device 451 to ensure the proper protrusion length of fiber will be extending from the end face of the connector ferrule after termination.

Figure 12E:
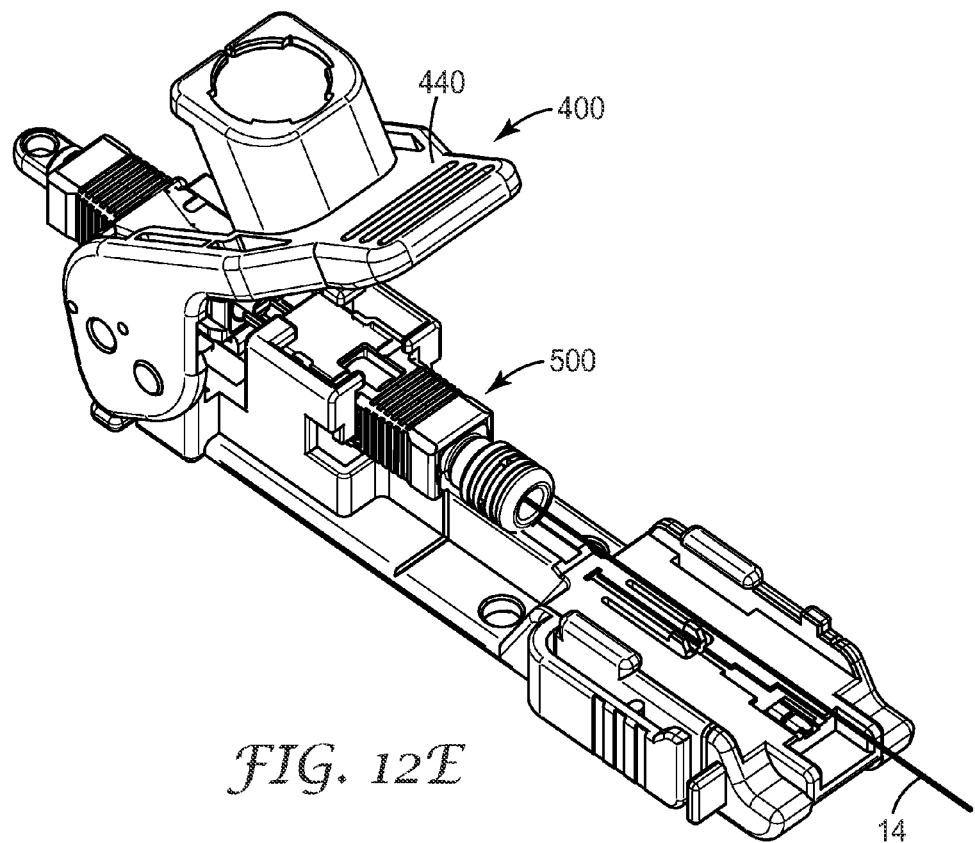

Referring to FIG. 12E, the actuation lever 140 is raised in an upward direction until it is restored to it original position. The clamping cover of the fiber holder assembly is raised releasing the optical fiber from the guiding channel of the fiber holder assembly and the fiber holder assembly tool can be removed from the assembly tool.

In an alternative assembly process, fiber holder is not used. The craftsman can carry out the fiber preparation by hand using conventional process. After the fiber has been prepared, the craftsman can insert the fiber into the optical fiber connector by hand until the end of the fiber extends past the end face of the connector ferrule as viewed through the inspection lens of the assembly tool. The craftsman can secure coated potion of optical fiber against the base of the assembly tool with their thumb and proceed with the final steps of the assembly process.

Figure 12F:
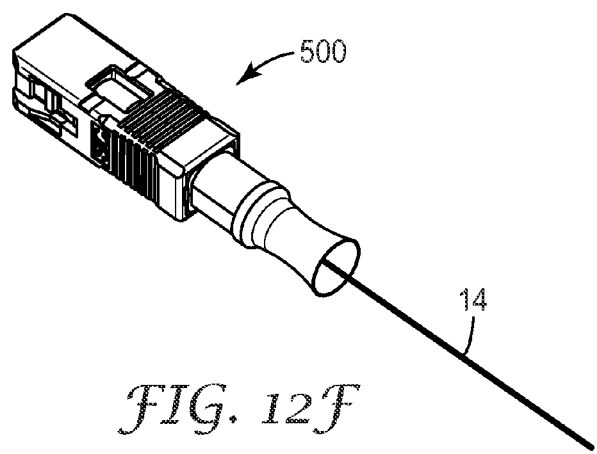

Finally, optical fiber connector can be removed from the assembly tool to yield a terminated optical fiber connector having a defined length of optical fiber protruding from the end face of the connector ferrule as shown in FIG. 12F. If appropriate a strain relief boot can be positioned on the back end of the optical fiber connector. This completes the termination process of optical fiber connector 500 in accordance with the current invention.

The optical fiber connector 500 can now be inserted into a connector receptacle configured to receive the optical fiber connector to make a service connection.

Thus, the assembly tool of the embodiments described herein provides a low cost, reliable means for terminating an optical fiber with an optical fiber connector. In addition, the ability to precisely set the length of fiber protruding from the end of the ferrule enables the use of a simple one-step finishing operation, if desired.

Although the present invention has been described with reference to the preferred embodiments disclosed herein, workers skilled in the art will recognize that changes may be made in form and detail without departing from the scope of the invention.

What is claimed is:

1. An assembly tool for installing an optical fiber in an optical fiber connector comprising: a base having a connector mount disposed on a first end thereof, the connector mount configured to receive and secure the optical fiber connector to the base; a cradle that holds a shaped ferrule disposed near a second end of the base, wherein the shaped ferrule is resiliently held within the cradle; further comprising a cantilevered actuation lever pivotally mounted on the base adjacent to the connector mount to engage a fiber securing mechanism in the optical fiber connector; further comprising an inspection lens disposed on the cantilevered actuation lever to visualize a terminal end of an optical fiber extending from an end face of a connector ferrule.

2. The assembly tool of claim 1, wherein the shaped ferrule comprises an end face having a slot therein, to set a protrusion length of a terminal end of the optical fiber, wherein the protrusion length corresponds to a distance that the terminal end of the optical fiber extends from an end of the connector ferrule.

3. The assembly tool of claim 2, wherein the slot in the end face of the shaped ferrule has a depth that corresponds to the protrusion length that the optical fiber extends from the end of the connector ferrule.

4. The assembly tool of claim 1, wherein the shaped ferrule comprises a stepped end face wherein the stepped end face has a characteristic height, wherein the characteristic height corresponds to a protrusion length of a terminal end of the optical fiber that extends from an end face of a connector ferrule after termination of the optical fiber connector.

5. The assembly tool of claim 1, wherein the optical fiber connector is a remote grip optical fiber connector.

6. The assembly tool of claim 1, further comprising a gripping portion disposed on an exterior surface of the base to enable the assembly tool to be held between a thumb and forefinger during use.

7. An assembly tool for installing an optical fiber in an optical fiber connector comprising:
   a base having a connector mount disposed thereon a first end thereof, the connector mount configured to receive and secure the optical fiber connector to the base;
   a cradle that holds a shaped ferrule disposed adjacent second end of the base, wherein the cradle is resiliently connected to the assembly tool; and
   a cantilevered actuation lever rotatably connected to the base, wherein the cantilevered actuation lever includes an inspection lens to visualize a terminal end of an optical fiber extending from an end face of a connector ferrule wherein the cantilevered actuation lever is pivotally mounted on the housing adjacent to the connector mount to engage a fiber securing mechanism in the optical fiber connector.

8. The assembly tool of claim 7 wherein the cantilevered actuation lever temporarily holds the inspection lens at a distance wherein the terminal end of the optical fiber extending from the end face of the connector ferrule is at a focal length of the inspection lens.

9. The assembly tool of claim 7 wherein the shaped ferrule comprises an end face having a slot therein, to set a protrusion length of a terminal end of the optical fiber, wherein the protrusion length corresponds to a distance that the terminal end of the optical fiber extends from an end of the connector ferrule.

10. The assembly tool of claim 9, wherein the slot in the end face of the shaped ferrule has a depth that corresponds to the protrusion length that the optical fiber extends from the end of the connector ferrule.

11. The assembly tool of claim 7, wherein the shaped ferrule comprises a stepped end face wherein the stepped end face has a characteristic height, wherein the characteristic height corresponds to a protrusion length of a terminal end of the optical fiber that extends from an end face of a connector ferrule after termination of the optical fiber connector.

* * * * *